United States Patent
Kake et al.

(10) Patent No.: US 7,990,385 B2
(45) Date of Patent: Aug. 2, 2011

(54) METHOD AND APPARATUS FOR GENERATING NEW IMAGES BY USING IMAGE DATA THAT VARY ALONG TIME AXIS

(75) Inventors: Tomokazu Kake, Tokyo (JP); Akio Ohba, Tokyo (JP); Akira Suzuki, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 10/693,231

(22) Filed: Oct. 23, 2003

(65) Prior Publication Data

US 2004/0130637 A1 Jul. 8, 2004

(30) Foreign Application Priority Data

Oct. 25, 2002 (JP) .................. 2002-311631
Sep. 18, 2003 (JP) .................. 2003-326771

(51) Int. Cl.
*G06T 13/00* (2011.01)
(52) U.S. Cl. .................. 345/473; 345/419; 345/420
(58) Field of Classification Search .................. 715/723, 715/976
See application file for complete search history.

(56) References Cited

U.S. PATENT DOCUMENTS

| | | | |
|---|---|---|---|
| 4,240,113 A | | 12/1980 | Michael et al. |
| 5,459,830 A | | 10/1995 | Ohba et al. .................. 395/152 |
| 5,537,528 A | * | 7/1996 | Takahashi et al. ............ 715/512 |
| 5,926,186 A | * | 7/1999 | Itoh et al. .................. 345/619 |
| 5,963,203 A | * | 10/1999 | Goldberg et al. ............. 715/723 |
| 6,215,505 B1 | * | 4/2001 | Minami et al. ................. 345/473 |
| 6,556,210 B1 | * | 4/2003 | Yamamoto et al. ........... 345/582 |
| 6,587,123 B2 | * | 7/2003 | Ando et al. .................. 715/723 |
| 6,665,342 B1 | * | 12/2003 | Brown et al. ............ 375/240.16 |
| 6,940,997 B1 | * | 9/2005 | Kaneko et al. ................ 382/103 |

FOREIGN PATENT DOCUMENTS

| | | |
|---|---|---|
| EP | 0512839 A2 | 11/1992 |
| EP | 0 684 059 A1 | 11/1995 |
| JP | 06-326991 | 11/1994 |
| JP | 09-035040 * | 2/1997 |
| JP | 10-164435 | 6/1998 |
| JP | 11-331795 | 11/1999 |
| WO | 99/52272 A1 | 10/1999 |

OTHER PUBLICATIONS

Foley et al., Computer Graphics: Principles and Practice, 1990, Addison-Wesely Publishing Company, Inc., Second Edition, pp. 680-681.*

Fels, S., Lee, E., Mase, K., Techniques for Interactive Video Cubism, Oct. 2000, Proceedings of ACM Multimedia, pp. 1-3.*

European Patent Office; "PCT International Search Report" issued over corresponding PCT International Application No. PCT/JP03/13468; dated Jan. 21, 2004; pp. 1-3.

(Continued)

*Primary Examiner* — Said Broome
(74) *Attorney, Agent, or Firm* — Fitch, Even, Tabin & Flannery

(57) ABSTRACT

A rectangular-parallelopiped space (box space) expresses the moving images by use of a virtual space. A plurality of frames contained in the moving images appear continuously along time axis. The box space is cut through by a desired surface, and an image projected on this cut surface is projected onto a plane parallel in the direction of time axis. Images sequentially projected onto the plane are outputted as new moving images.

36 Claims, 15 Drawing Sheets

OTHER PUBLICATIONS

Japanese Patent Office, "Notification of Reason(s) for Refusal," dated Feb. 14, 2006, for corresponding Japanese patent application No. 2003-326771, 7 pages.

The Patent Office of the People's Republic of China, "The First Office Action" for corresponding Chinese Application No. 200380101976.8, Oct. 13, 2006, 8 pages.

Japanese Patent Office, "Notification of Reason(s) for Refusal," for corresponding Japanese patent Application No. 2003-326771, Jan. 9, 2007, 4 pages.

European Patent Office; "Extended European Search Report" issued in corresponding European Application No. 11159531.0; dated Apr. 27, 2011; 7 pages.

* cited by examiner

FIG. 6A
FIG. 6B
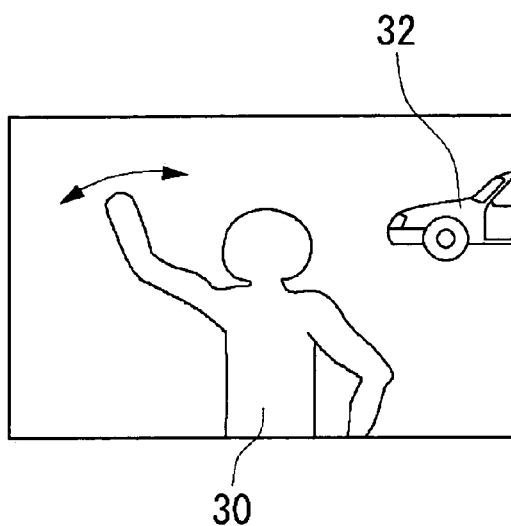
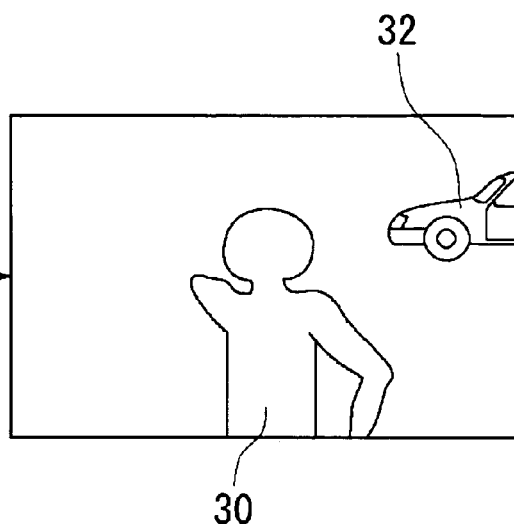

METHOD AND APPARATUS FOR GENERATING NEW IMAGES BY USING IMAGE DATA THAT VARY ALONG TIME AXIS

BACKGROUND OF THE INVENTION

1. Field of the Invention

The present invention relates to method and apparatus for generating images, and it particularly relates to a technology in which moving images shot by a camera are processed and the thus processed moving images are outputted anew.

2. Description of the Related Art

With the remarkable advancement and development of computer technology in recent years, the image processing capability provided with the computers has significantly improved. Even home PCs (personal computers) and game machines available for the general consumers can easily realize a diverse range of processings which once the high-end workstation for exclusive-use with image processing could only achieve.

The improvement on the performance and capability in the image processing by the PCs afforded another potential use of the home PCs and game machines. That is, the various kinds of tools used for movie editing, image processing, authoring and the like are now available at low price targeting the general consumers. Thus, the professionalism is no longer prerequisite to handling the complicated image processing, and even an amateur user can easily handle the processing of moving pictures by using these readily available tools.

SUMMARY OF THE INVENTION

In view of the foregoing situations, the inventors of the present invention have come to search for an innovative image-processing method by which to be able to obtain novel and special-effect-like images. The inventors of the present invention invented the present invention on the basis of the above-mentioned recognition, and an object of the present invention is to obtain entertaining images. Moreover, the present invention was made in view of any of the following objectives or other objectives understood via description of the present patent specifications. Namely, the objectives include improving the efficiency of image processing, reducing a load caused by the image processing, new proposals to improve the image processing technology and so forth.

A preferred embodiment according to the present invention relates to an image generating method. This method includes: regarding original moving pictures as two-dimensional images that vary along time axis, and when the moving pictures are expressed, in a virtual manner, as a box space formed by the two-dimensional images and the time axis, cutting the box space by a surface that contains a plurality of points each of which differs from the other in time value; projecting an image that appears on the cut surface onto a plane in the direction of time axis; and outputting the images appearing on the plane as new moving pictures, by varying the cut surface in time. The contents of a change are determined by setting the surface in various ways, and new moving pictures that differ from the contents of the original moving pictures are outputted.

Here, the "original moving pictures" may be images presently shot by a camera, or may be images, stored beforehand in a recoding medium, such as images coded by an MPEG format or the like. "Projecting onto a plane" is such that, if projected onto a plane on time axis, images to be projected on this plane will be the result of this "projecting onto a plane". Specifically speaking, it means that, when the cut surface is directly viewed from the direction of time axis, the images to be projected on this cut surface is equal to those projected on the plane.

"Varying the cut surface in time" may be realized, for example, by moving the cut surface along time axis while the surface shape of the cut surface is kept intact. By moving the cut surface as time elapses, smooth and continuous new moving pictures are obtained. The surface shape may be varied as time elapses. If the position of a point, contained in the surface, on time axis is denoted by t and the coordinates of a point contained in two-dimensional images is denoted by $(x, y)$, then t may be defined by $t=f(x, y)$ which is a function expressed by a general equation. The surface may be a plane. The projected image varies depending on what kind of a surface shape is set.

Another preferred embodiment according to the present invention relates to an image generating apparatus. This apparatus includes: an image memory which sequentially stores original moving pictures along time axis; an image conversion unit which regards the original moving pictures stored in the image memory as two-dimensional images that vary along time axis and, when the moving pictures are expressed, in a virtual manner, as a box space formed by the two-dimensional images and the time axis, cuts the box space by a surface that contains a plurality of points each of which differs from the other in time value, and which projects an image that appears on the cut surface onto a plane in the direction of time axis; and an image data output unit which sets to a new moving-picture frame the images appearing on the plane obtained by varying the cut surface in time in the image conversion unit. The image memory functions as a buffer which temporarily stores a plurality of frames for a fixed period of time until the frames contained in the original moving pictures have been converted to new frames.

The image generating apparatus may further include an image input unit which acquires as the original moving pictures the images shot by the camera and sends these acquired images to the image memory. Thereby, the images shot are image-processed in real time, so that unique, mysterious or special-effect-like images that differ from the actual status of an object can be displayed on a screen.

The image conversion unit may cut the box by a surface which is defined by a function of coordinates of an image region that constitutes a two-dimensional image. Here, the "image region" may be a region covering a single pixel or a region covering a pixel block. The surface thereof may be defined by a function that does not depend on the coordinate of the two-dimensional image in the horizontal direction. The "horizontal direction" may be the direction of scanning lines. The image conversion unit may cut the box by a surface which is defined by a function with respect to attribute values of an image region that constitutes the two-dimensional image. The "attribute value" may be various parameters, which decide the contents of a display for each pixel, such as a pixel value, a depth value, the order of approximation with a specific image pattern, the degree of change with other frames or the like. This attribute value may be an average value or central value in the image region.

Time values for the points contained in the above-mentioned surface may be determined according to any parameter among the pixel value, the depth value, the order of approximation and the degree of change. Moreover, which image region is to be projected on the above-mentioned plane may be determined according to any parameter among the pixel value, the depth value, the order of approximation and the degree of change.

Still another preferred embodiment according to the present invention relates to an image generating method. This method includes: reading out, for each in-picture position of an image contained in a target frame in original moving pictures, data that correspond to the in-picture position, from at least one of a plurality of frames contained in the original moving pictures; synthesizing the read-out data; and forming new moving pictures by sequentially outputting frames formed in the synthesizing. Data are respectively read out, in units of pixel or pixel line, from the frames in the past and are then synthesized, so that images different from the original moving pictures are obtained. These are so-called patched-up images that contain temporally different data mixedly combined in units of pixel or pixel line, so that unique and mysterious images that cannot exist in the real world can be obtained.

A "target frame" is a frame that serves as a reference at the time of display, and may change as time elapses. In the conventional scanning method, this "target frame" corresponds to, for example, the current frame which is to be outputted at the present timing. Based on this target frame, judged is which actual data are to be read out and outputted from which frame. The "in-picture position" may be the position of a pixel line which is a scanning line, or may be the position of a pixel. From frames, the respective data corresponding thereto may be read out and synthesized in units of pixel line or pixel. The "synthesizing" may be any one among image superposition, mixture, substitution and gluing.

Still another preferred embodiment according to the present invention relates to an image generating apparatus which includes an image memory, an image conversion unit and an image data output unit. The image memory records, in sequence, original moving pictures for each frame. The image conversion unit reads out, for each in-picture position of an image contained in a target frame, data that correspond to the in-picture position from at least one of frames recorded in the image memory and synthesizes the data. The image data output unit sequentially outputs frames synthesized and reconstructed by the image conversion unit. The image memory functions as a buffer which temporarily stores a plurality of frames within a predetermined period of time, until the frames contained in the original moving pictures have been converted to new frames and those frames are no longer in use. The "pixel" is a dot that constitutes an image displayed on a screen and may be a pixel which can be color-expressed by a set of RGBs.

It is to be noted that any arbitrary combination of the above-described structural components and expressions changed between a method, an apparatus, a system, a computer program, a recording medium that stores the computer program, a data structure and so forth are all effective as and encompassed by the present embodiments.

Moreover, this summary of the invention does not necessarily describe all necessary features so that the invention may also be sub-combination of these described features.

BRIEF DESCRIPTION OF THE DRAWINGS

FIGS. 6A and 6B are provided to compare a screen showing an object shot with a screen showing what is actually displayed, according to the second embodiment.

DETAILED DESCRIPTION OF THE INVENTION

The invention will now be described based on embodiments which do not intend to limit the scope of the present invention but exemplify the invention. All of the features and the combinations thereof described in the embodiments are not necessarily essential to the invention.

First Embodiment

According to a first embodiment of the present invention, a plurality of frames contained in original moving pictures are sequentially stored in a ring buffer (see FIG. 3), and data are, for each scanning line, read out from different frames, so that the thus read-out data are displayed on a screen as a new frame. Specifically, data on pixels on a scanning line located at the upper edge of a screen are read out from newer frames whereas those at the lower edge thereof are read out from previous frames which are older in time. On the screen, displayed is a strange and mysterious image which differs from an actual object.

Figure 1:
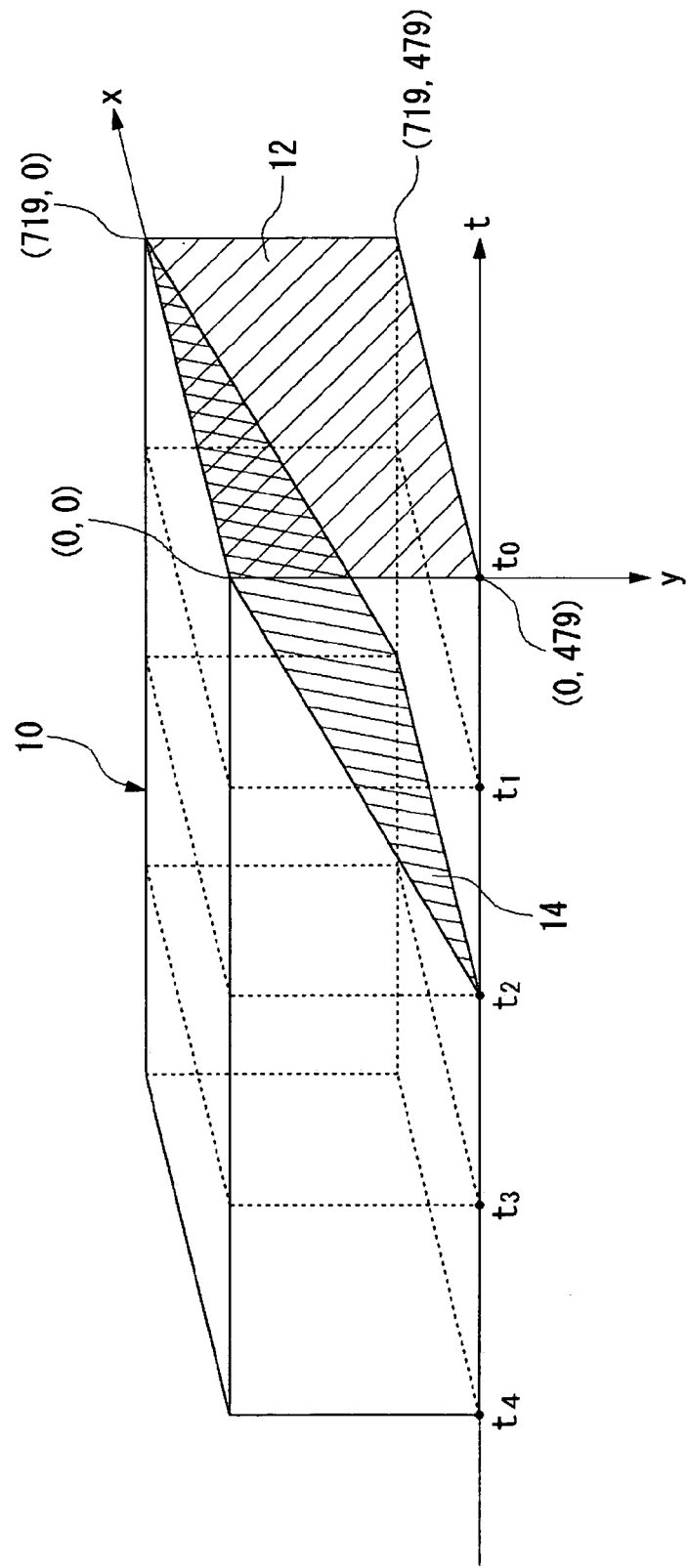
FIG. 1 illustrates and expresses a state, in a virtual manner, where frames of the original moving pictures appear continuously along time axis, in a first embodiment according to the present invention.

FIG. 1 illustrates and expresses a state, in a virtual manner, where frames of the original moving pictures appear continuously along time axis. The original moving pictures are regarded and grasped as two-dimensional images that change along the time axis. A rectangular-parallelopiped space 10 (hereinafter referred to as a "box space" also) extends in the direction of time axis t as time elapses. A cross section vertical to the time axis t represents a frame. A frame is a set of pixels represented by the coordinates of a plane formed by x axis and y axis. This box space 10 is cut by a surface having a desired shape. According to the first embodiment, the box space 10 is cut by a slope face which is parallel to the x axis, in the direction from the x axis above toward a line below as time elapses from time $t_0$ through time $t_1$, as shown in FIG. 1.

When an image that appears on a cut surface 14 is projected on a plane in the direction of time axis, the image projected onto the plane on the time axis is outputted as an actual frame instead of the current frame 12.

The cut surface 14 moves along the time axis t as the time elapses. The cut surface 14 is defined in a manner such that it has continuous width in the direction of time axis t. Images contained in this width are synthesized and those synthesized images serve as frames displayed actually on the screen.

The current frame 12 corresponds to a frame which should have been at the timing of being presently scanned in the normal display scheme. Let the present position of the current frame 12 on the time axis be at time $t_0$. Then, frames prior to time $t_0$, which are, for example, respective frames positioned at $t_1$, $t_2$, $t_3$ and $t_4$, correspond to frames that should have been already displayed under the normal display timing. In this first embodiment, however, the display of the frames prior to time to are actually delayed. Data on pixels contained in each frame are outputted in a manner such that the output of the data is delayed in sequence for each pixel line in the horizontal direction. Data of each pixel contained in a single pixel line are read out at the same scanning timing and then displayed.

A pixel line at the highest point is outputted at the normal scanning timing. Thereafter, a pixel line positioned one pixel below the one at the highest point is outputted with a delay of one frame. Thus, the lower the order of the pixel line is, it is outputted at the further delayed timing.

Data of each pixel on the screen are read out from the frames in the past, and how far back in the past these frames shall be may be expressed by a function of pixel coordinates, such as $t=t_0-y$. The function $t=t_0-y$ is a function of only y coordinate of the pixel line, and does not depend on the x coordinate of the pixel line.

In a case where the resolution of the current frame 12 is 720×480, let the coordinates of the upper-left pixel be (0, 0) and the coordinates of the lower-right pixel be (719, 479). In this case, the maximum value of the coordinate y is 479, and the scanning timing of the lowest-order pixel line is delayed by 479 frames. In the box space 10, there are 480 frames placed between time $t_0$ and time $t_2$.

Figure 2A:
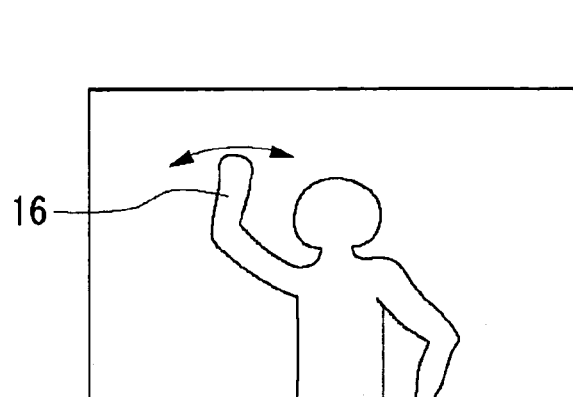
FIGS. 2A and 2B are provided to compare a screen showing an object shot with a screen showing what is actually displayed.
Figure 2B:
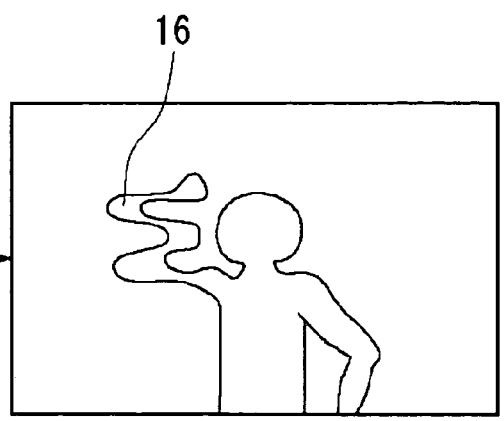

FIGS. 2A and 2B illustrate a screen showing a photographed object and one showing what is actually displayed, respectively, and are also provided to compare the former with the latter. FIG. 2A shows an image shot, and the image of this object is equivalent to the current frame 12. Here, the object waves his/her hand 16 slowly. FIG. 2B is an image that appears in the cut-surface 14 shown in FIG. 1, and is the image where the object of FIG. 2A is actually displayed on the screen. Thus, the object having a shape different from the proper and natural object itself is displayed on the screen. In other words, according to the past frames through the current frame, the position of the hand 16 changes from a left side to a midpoint, right side, midpoint and left side in this order, so that the image of the hand 16 at the left-side position and the image at right-side position appear alternately by reading out data for each scanning line from the different past frames. Since the data on the same scanning line are read out from the frames of the temporally same scanning timing, no curvature or deformation is caused in the horizontal direction. In the vertical direction, however, the hand 16 is displayed in a manner such that the shape of the hand 16 is meandering-like and curved in the left and right sides.

On the other hand, this object waving the hand 16 hardly moves except for the hand 16. Thus, even if images read out from the frames, which differ temporally from one another, are synthesized, the curvature or deformation is almost absent because there is no difference in the display position thereof.

Figure 3:
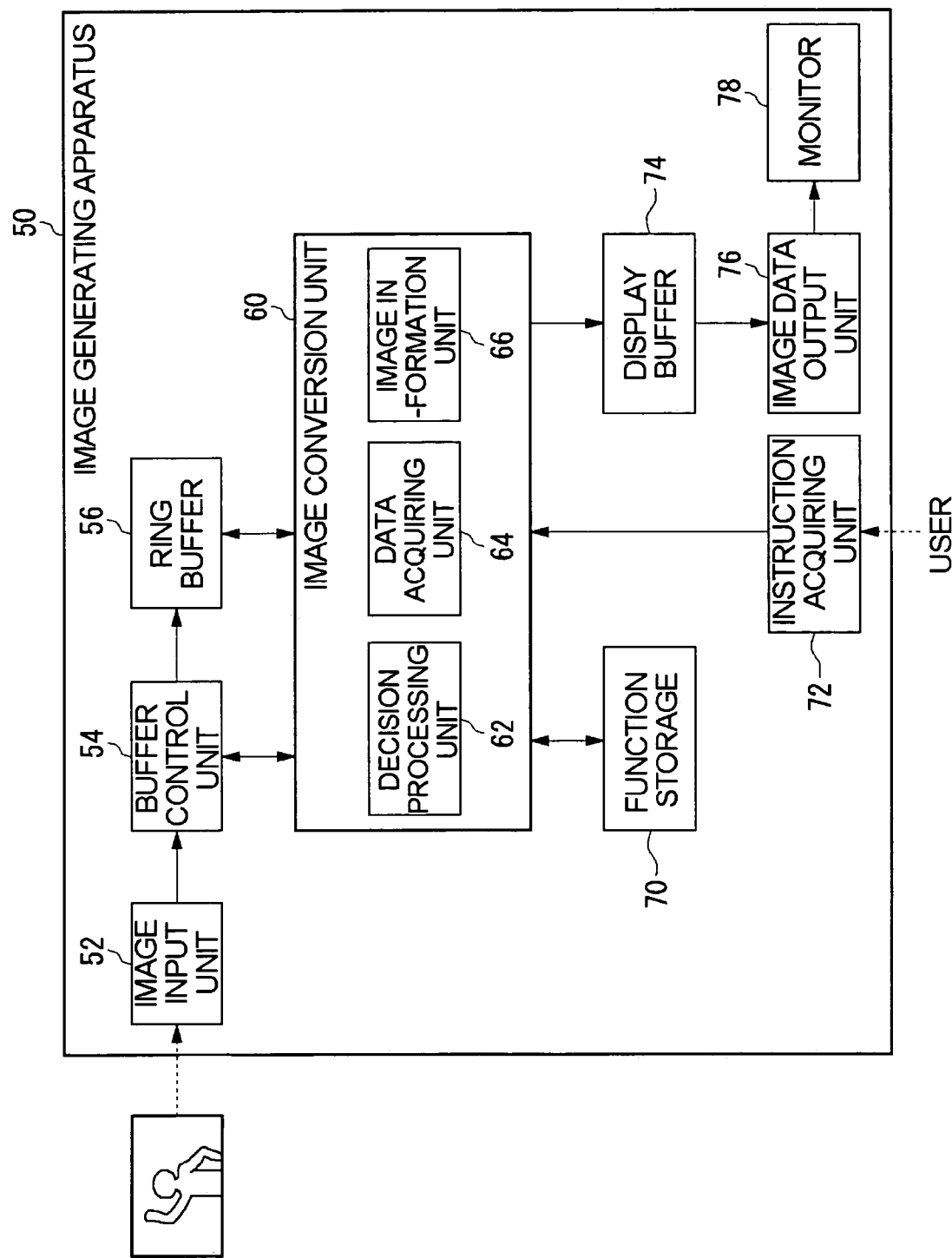
FIG. 3 is a block diagram showing functions of an image generating apparatus according to the first embodiment.

FIG. 3 is a block diagram showing functions of an image generating apparatus according to the first embodiment. In terms of hardware, the structure of the image generating apparatus 50 can be realized by elements such as a CPU and the like of an arbitrary computer. In terms of software, it is realized by programs or the like having functions of data storage, image processing and drawing, but illustrated and described in FIG. 3 are functional blocks that are realized in cooperation with those. Thus, these functional blocks can be realized in a variety of forms by hardware only, software only or the combination thereof.

The image generating apparatus 50 is comprised of an image input unit 52 which acquires images shot by a camera as original moving pictures, and sends frames contained in the original moving pictures to an image memory, a ring buffer 56 which serves as the image memory that sequentially stores the original moving pictures along time axis, a buffer control unit 54 which controls the read and write of a frame from and to the ring buffer 56, an image conversion unit 60 which converts frames stored in the ring buffer 56 into frames for use with display, a function storage 70 which stores functions referred to at the time of frame conversion, and a display buffer 74 which stores the frames for use with display.

The image input unit 52 may include a CCD that captures digital images, and a conversion unit that obtains digital images by A-D conversion. The image input unit 52 may be realized as a device which is provided externally in a detachable manner and is mounted on the image generating apparatus 50. The buffer control unit 54 sequentially records the frames of the original moving pictures inputted by the image input unit 52, to a region indicated by a write pointer of the ring buffer 56.

For each pixel contained in the current frame 12, the image conversion unit 60 reads out data corresponding to the pixel from the frame recorded in the ring buffer 56, and synthesizes the data. The image conversion unit 60 includes a decision processing unit 62 which determines from which frame the data shall be read out for each pixel, a data acquiring unit 64 which reads out data from the frame determined by the decision processing unit 62, and an image formation unit 66 which forms a frame by synthesizing data for each read-out pixel line.

In the decision processing unit 62, a decision as to from which frame the data shall be read out is made based on and defined by the following equation (1).

$$P_{Fr}(x,y,t_0)=P(x,y,t_0-y) \quad (1)$$

where, as shown in FIG. 1, x and y are pixel coordinates on the current frame 12 and to is a time value on the time axis t. $P_{Fr}$ is a pixel value of each pixel in the actually outputted frame. As evident from the equation (1), the time value of a frame to be outputted is a function of the coordinate y only. Thus, the decision as to from which frame the data shall be read out among a plurality of frames stored in the ring buffer 56 is made for each pixel line, and does not depend on the coordinate x.

The function expressed by the equation (1) is stored in the function storage 70. Other optional functions are also stored in the function storage 70. A user can set to adopt which function to use via an instruction acquiring unit 72.

Data for each pixel read out by the data acquiring unit 64 are sequentially written to the display buffer 74 by the image formation unit 66 which has a function serving as a graphic ship, so that a frame is composed thereby.

The image generating apparatus 50 further includes an instruction acquiring unit 72 which receives an instruction from the user, an image data output unit 76 which outputs frames stored in the display buffer 74, and a monitor 78 which displays the outputted frame on a screen. The monitor 78 may be a display provided externally to the image generating apparatus 50.

The image data output unit 76 reads out image data from the display buffer 74 which stores the image data for one frame, then converts them into analog signals and sends them out to the monitor 78. The image data output unit 76 outputs sequentially the frames stored in the display buffer 74 so as to output new moving pictures.

Figure 4:
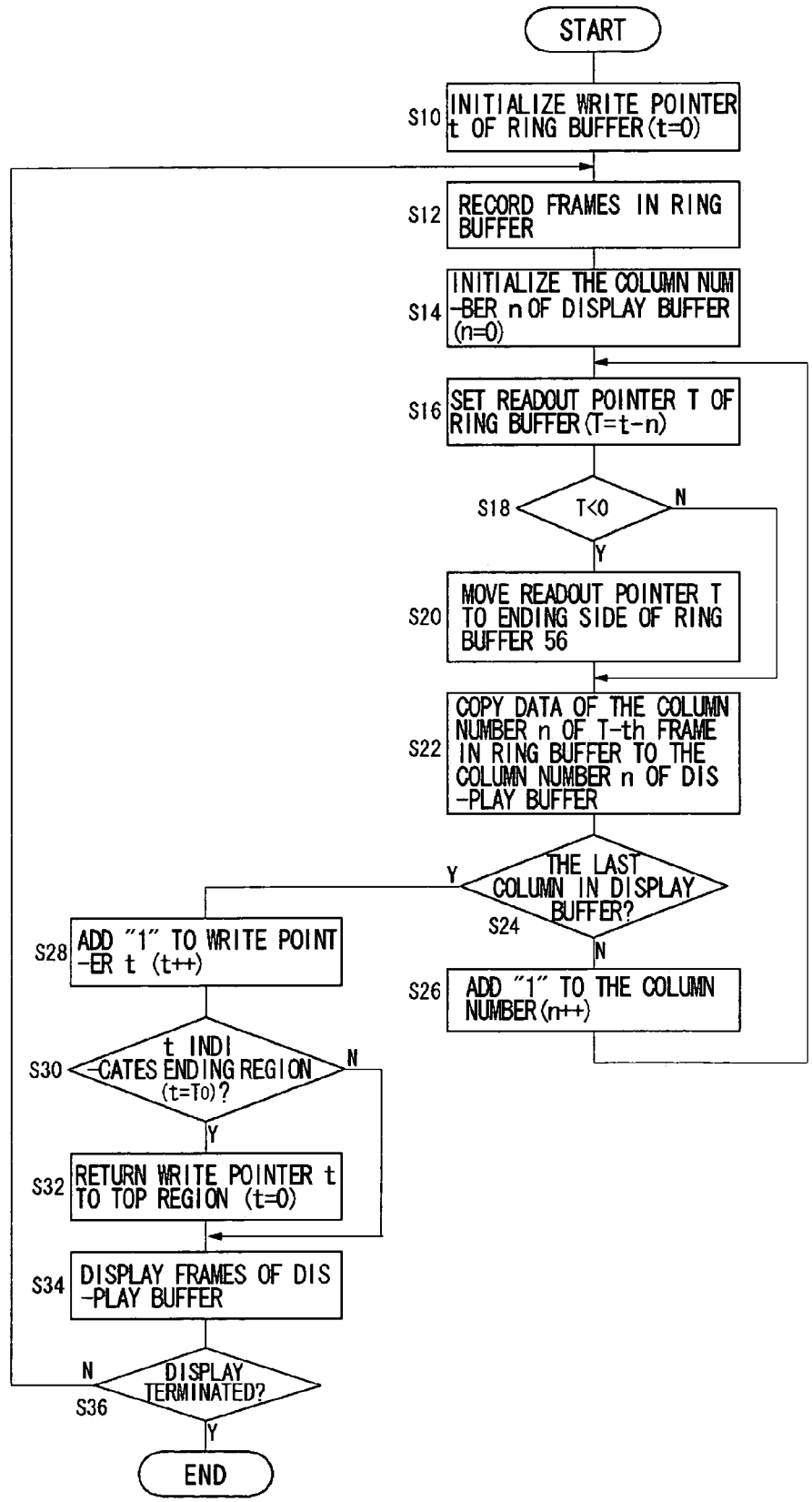
FIG. 4 is a flowchart showing the steps of converting the original moving pictures to new moving pictures according to the first embodiment.

FIG. 4 is a flowchart showing the steps of converting the original moving pictures into new moving pictures according to the first embodiment. First, the write pointer t that indicates the next write position in the ring buffer 56 is initialized, that is, set to t=0 (S10), so that the frames are stored starting from the top region of the ring buffer 56. The frames contained in the original moving pictures are recorded in the t-th region of the ring buffer 56 (S12). Thus, the total of $T_0$ regions for one frame are provided.

The pixel line number n in the display buffer 74 is initialized, that is, set to n=0 (S14), so that the data starting from those corresponding to the top line of the screen are sequentially copied to the display buffer 74. Calculated is a readout pointer T that designates a read-out position of data corresponding to the line number n (S16) Here, T is obtained as T=t-n. As the line number n increases, the readout pointer T further goes back to the frames in the past. Initially, T=0−0=0, thus the readout pointer T indicates the 0-th region.

If the readout pointer T is smaller than 0 (S18Y), such a readout pointer does not actually exist. Thus, the readout pointer T is moved to an ending side of the ring buffer 56 (S20). Stating more concretely, the number of regions $T_0$ of the ring buffer 56 is added to the readout pointer T. The data acquiring unit 64 reads out the line number n from the frames stored in the region of the readout pointer T in the ring buffer 56, and the image formation unit 66 copies the data corresponding to this read-out number to the region of the line number n of the display buffer 74.

When the line number n is not of the last line in the display buffer 74 (S24N), "1" is added to the line number n (S26). The line number n continues to be incremented and the processings of S16 through S24 are repeated until the line number n hits the last line. When the line number n becomes the number corresponding to the last line, the image data for one frame are stored in the display buffer 74 (S24Y), and "1" is added to the write pointer t (S28). When the write pointer t indicates an ending region of the ring buffer 56 (S30Y), the write pointer t is returned to the top region of the ring buffer 56 (S32).

The image data output unit 76 reads out frames from the display buffer 74, outputs the frames as video data and has the monitor 78 display the frames on the screen (S34). The processings of S12 through S34 are repeated until the termination of the display is instructed (S36). In this manner, the data are read out from the same frame in units of pixel line and then written to the display buffer. However, the pixel lines are primarily a plurality of pixel sets which are the same as scanning lines arranged in the horizontal direction, so that the pixel lines are the data which should be read out at the same scanning timing in the normal setting. Thus, the read and write are efficiently processed in the course of scanning, and the excessive increase of a load due to the image conversion in the present embodiment can be prevented.

As a modified example to the present embodiment, the decision processing unit 62 may determine a frame to be read out from, according to the coordinate x. For instance, as for a pixel line located at the left hand edge of the screen, the data thereof are read out from the left hand edge of the current frame 12 whereas, as for a pixel line at the right hand edge of the screen, the data thereof are read out from the right-hand-edge pixel line of a frame at time $t_2$ shown in FIG. 1. Then, the cut surface thereof will be a surface cut by a slope face over time $t_0$ to time $t_2$ where this slope face is parallel to the y axis.

As another modification, the decision processing unit 62 may determine a frame to be read out from, according to both x and y coordinates. For instance, as for a pixel at the upper left edge of the screen, the data thereof are read out from the upper left edge of the current frame 12 whereas, as for a pixel at the lower right edge of the screen, the data thereof are read out from the lower-right-edge pixel of a frame at time $t_2$ shown in FIG. 1.

As still another modification, the scanning line may be set in the vertical direction instead of the horizontal direction. In that case, further efficient image conversion can be realized by determining the frame to be read out from, according to the x coordinate.

Second Embodiment

In a second embodiment, data are read out from different frames according to a depth value (Z value) specified for each pixel. Hence, in this point the processing carried out by the second embodiment differs from that of the first embodiment where the frame is determined according to the y coordinate of a pixel. For example, among objects shot in the original moving pictures, the data of one situated closer to the camera is read out from the older frame. Thus, the smaller the distance between the camera and the object becomes, the more delayed the display timing thereof becomes.

Figure 5:
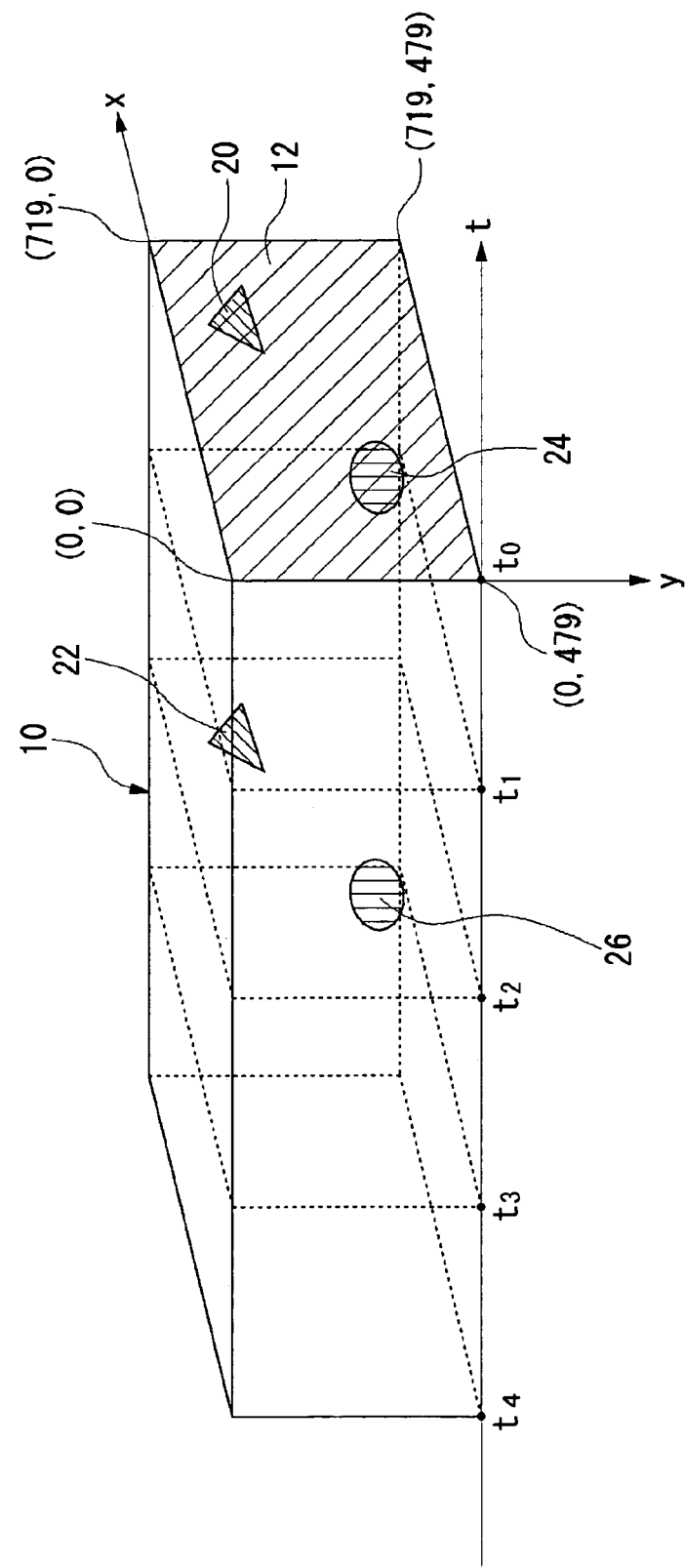
FIG. 5 illustrates, in a virtual manner, the original moving pictures as a box space, according to a second embodiment.

FIG. 5 illustrates, in a virtual manner, the original moving pictures as a box space, according to the second embodiment. Among the objects shot in the current frame 12, the Z value of a first image 20 is set to "120" while the Z value of a second image 24 is set to "60". The greater the Z value becomes, it means that the closer the object is located to the camera. The delayed amount of the display timing increases in proportion to the Z value. Each pixel of the frames actually displayed on the screen is defined by the following equation (2).

$$P_{Fr}(x,y,t_0)=P(x,y,t_0-Z(x,y,t_0)) \qquad (2)$$

where $Z(x, y, t_0)$ is the Z value of a pixel unit at the present time. As the Z value becomes larger, the frame from which the pixel data thereof are read out goes further back from to toward the direction of $t_1$ and $t_2$ on time axis t. Data corresponding to the first image 20 are read out from a region which is indicated as a third image 22 in a frame on time $t_2$. Data corresponding to the second image 24 are read out from a region which is indicated as a fourth image 26 in a frame at time $t_1$.

In the cut surface of the box space 10, the region of the third image 22 takes a time value of $t_2$ whereas the region of the fourth image 26 takes a time value of $t_1$. The other regions take a time value of $t_0$. Thus, points contained in the cut surface are scattered at $t_0$, $t_1$ and $t_2$, so that the cut surface thereof has discrete widths in the direction of time axis.

The pixels that constitute the first image 20 have greater Z values than those of the second image 24, and the data thereof are read out from older frames in time. Namely, since the pixels that constitute the second image 24 have smaller Z values than those of the first image 20, the time duration required for going back toward older frames is shorter.

FIGS. 6A and 6B are provided to compare a screen showing an object shot with a screen showing what is actually displayed. FIG. 6A represents the object shot and, the object shot in this case is a person 30 who raised his/her hand and just started waving the hand to the right and left slowly and an automobile 32 which runs in the back. FIG. 6B represents an image where the object shown in FIG. 6A is actually projected on the screen. The object is displayed on the screen in a state that differs from a normal setting. Namely, the closer a region thereof is to the camera, the further delayed the display timing thereof is. Now, the person 30 is the object closest to the camera, thus the amount of delay in display timing is the greatest, in particular. As for a portion or region that hardly moves, displaying the older image for its pixels will result in almost the same image of the object. On the other hand, as for an image of a region that moves frequently or greatly in the left-right or up-down directions, the display position thereof on the frame is moved. Thus, even when the data thereof are read out from the old frames under the coordinates corresponding to those in FIG. 6A, such the image of the region would be transparent or in a permeated state as shown in FIG. 6B. The person 30 is displayed on the screen in a state where the hand portion that frequently moves is missing in FIG. 6B. The automobile 32 at the back is located relatively far from the camera and the Z value thereof is small, thus there is little difference in between the display status of the automobile shown in FIG. 6A and that shown in FIG. 6B.

The image generating apparatus 50 according to this second embodiment has basically the same structure as the apparatus shown in FIG. 3. In accordance with the above equation (2), the decision processing unit 62 computes an amount of time $t_0$ go back in the past according to each Z value, and then determines for each pixel cell the frame from which the data are to be read out. Hereinafter, the frame or frames from which the data are to be read out will be also referred to as a source frame or source frames. The image input unit 52 according to the second embodiment includes a distance-measuring sensor by which a Z value of each pixel cell is detected. A distance-measuring method may be a laser method, an infrared illumination method, a phase detection method or the like.

Figure 7:
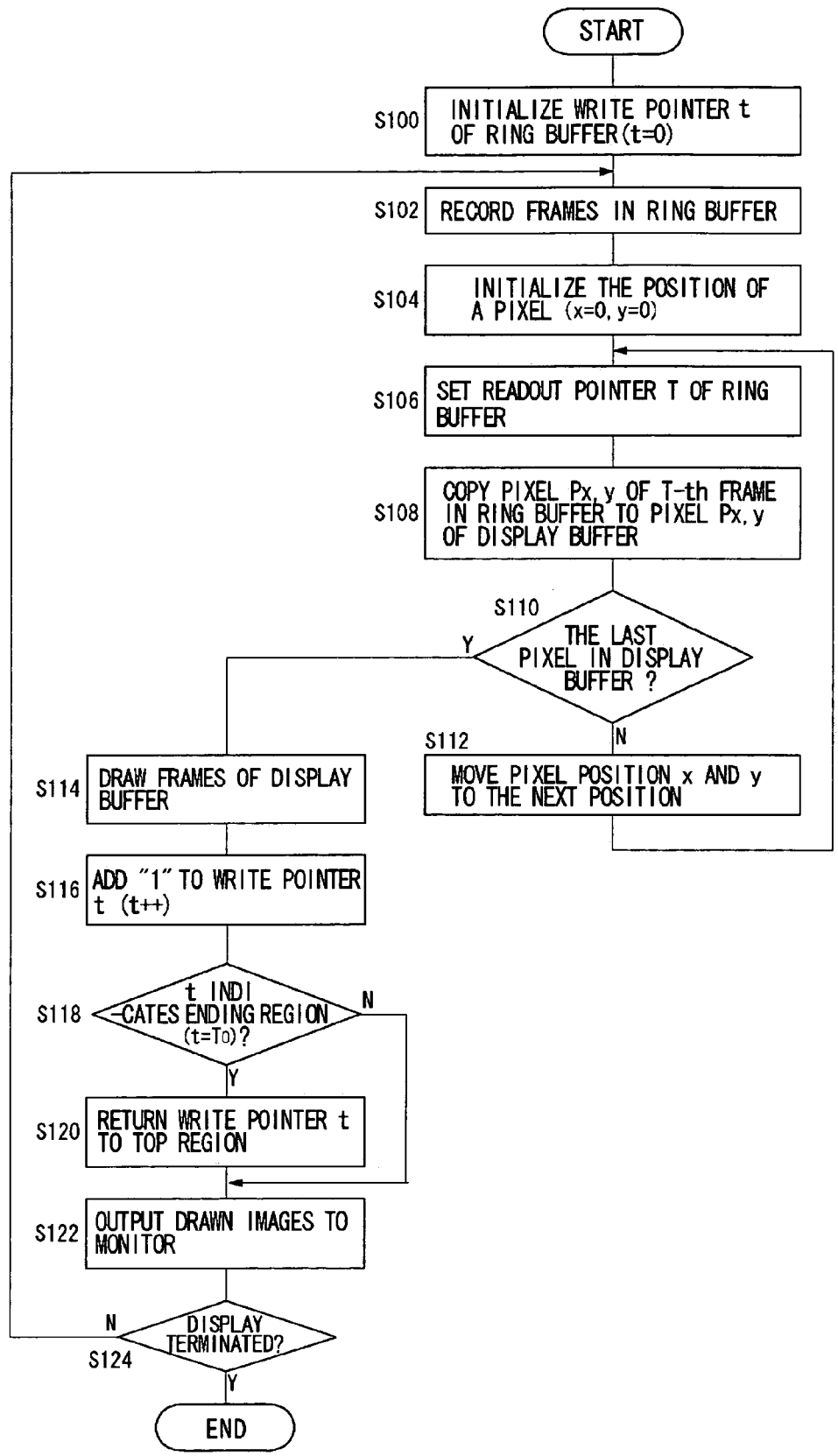
FIG. 7 is a flowchart showing the steps of generating new moving pictures by reading out data from a frame according to a Z value, in the second embodiment.

FIG. 7 is a flowchart showing the steps of generating new moving pictures by reading out data from the frame according to a Z value, in the second embodiment. First, a write pointer t that indicates the next write position in the ring buffer 56 is initialized, that is, set to t=0 (S100), so that the frames are stored starting from the top region of the ring buffer 56. The frames contained in the original moving pictures are recorded in the t-th region of the ring buffer 56 (S102).

The positions x and y of a target pixel are initialized in the display buffer 74, that is, the positions x and y are set to x=0 and y=0 (S104), so that the pixels starting from the top line of the screen are sequentially copied to the display buffer 74. Calculated is a readout pointer T that designates readout positions of data corresponding to the pixels x and y (S106). The decision processing unit 62 computes the readout pointer T according to the Z value for each pixel. The data acquiring unit 64 reads out data of a pixel $P_{x,y}$ from the frames stored in a region of the readout pointer T in the ring buffer 56. Then, the image formation unit 66 copies this read-out data to a region of the pixel $P_{x,y}$ in the display buffer 74 (S108).

When the $P_{x,y}$ is not yet the last pixel in the display buffer 74, namely, when the pixel $P_{x,y}$ is not the pixel of the lower right edge (S110N), the pixel $P_{x,y}$ is moved to the next pixel (S112). The processings of S106 through S112 are repeated until the pixel $P_{x,y}$ becomes the last pixel. When the pixel $P_{x,y}$ becomes the last pixel, the image for one frame is written to the display buffer 74 (S110Y) and this is drawn by the image formation unit 66 (S114).

"1" is added to the write pointer t (S116). When the write pointer t indicates an ending region of the ring buffer 56 (S118Y), the write pointer t is returned to the top region of the ring buffer 56 (S120). The image data output unit 76 outputs the drawn images to the monitor 78 (S122). The processings of S102 through S122 are repeated until the termination of the display is instructed (S124). In this manner, the data are read out from a separate frame in units of pixel and then written to the display buffer 74. It is to be noted here that from which frame the data are to be read out is separately determined for each pixel and, as a result thereof, the data may be read out from a different frame or the same frame.

Third Embodiment

A third embodiment according to the present invention differs from the first and second embodiments in that images are synthesized by reading out data of pixels having desired attribute values from a plurality of frames. The above-mentioned attribute value is a pixel value; for example, when the images are synthesized by reading out image values having red color components only, mysterious and special-effect-like images are obtained where the desired color only is lingering on as if it were an after-image.

Figure 8:
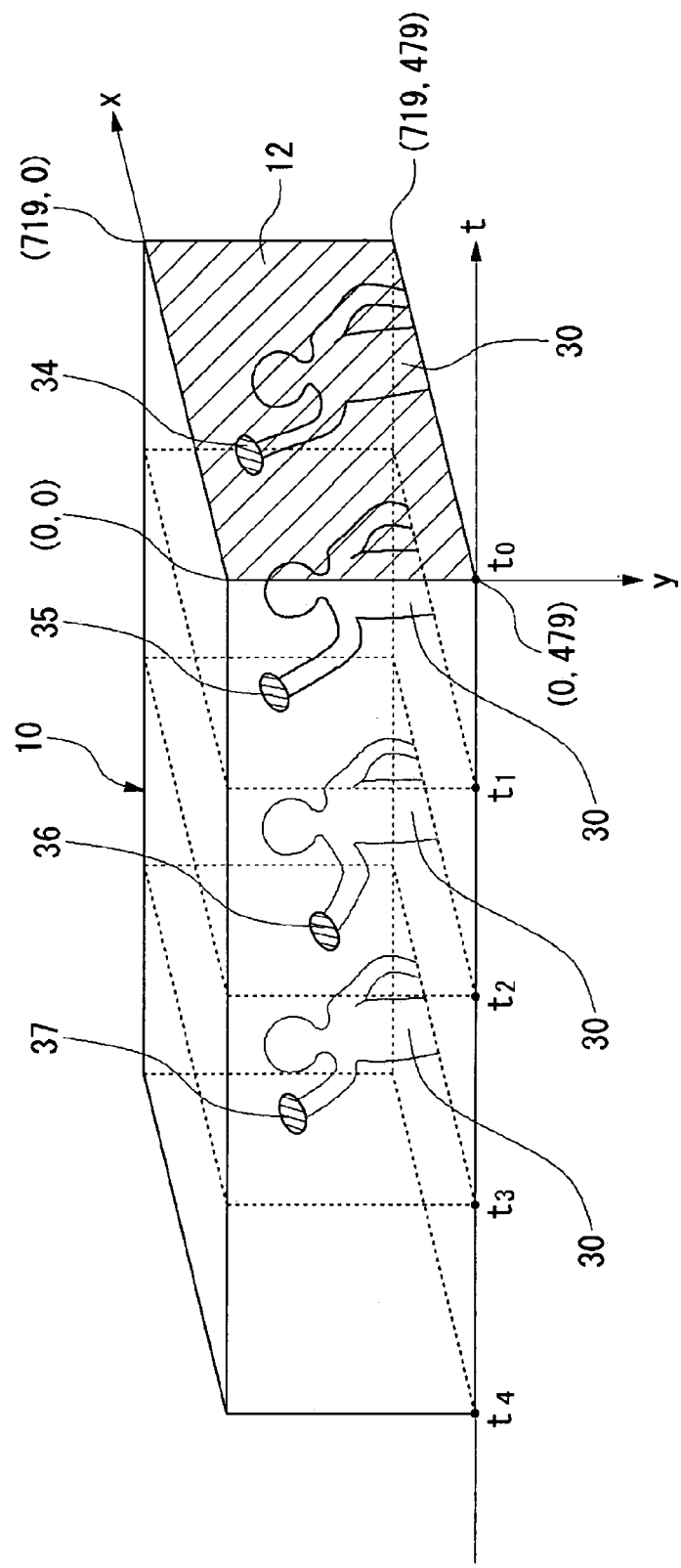
FIG. 8 illustrates, in a virtual manner, the original moving pictures as a box space, according to a third embodiment.

FIG. 8 illustrates, in a virtual manner, the original moving pictures as a box space, according to the third embodiment. A person 30 projected on the frames at time $t_0$, $t_1$, $t_2$ and $t_3$ in the box space 10 is an object who slowly waves the hand, holding a red material object, in the left and right directions. The respective display positions of the red material object images 34, 35, 36 and 37 projected on the respective frames differ from one another.

According to the third embodiment, frames to be utilized for image composition or image synthesis are determined in advance among a plurality of old frames-stored in the ring buffer 56. In the case of FIG. 8, the four frames at time $t_0$, $t_1$, $t_2$ and $t_3$ are used for the image composition. These four frames are a plurality of surfaces arranged at fixed time intervals within the box space 10.

Figure 9A:
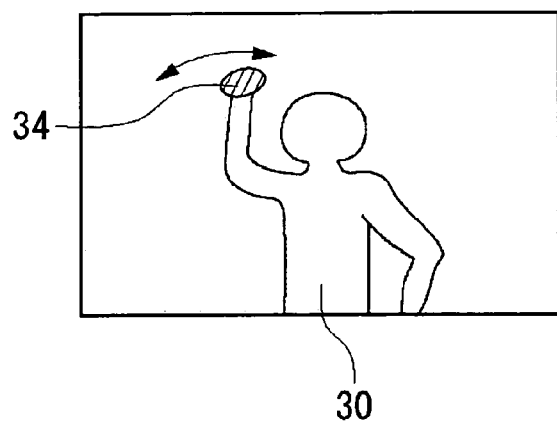
FIGS. 9A and 9B are provided to compare a screen showing an object shot with a screen showing what is actually displayed, according to the third embodiment.
Figure 9B:
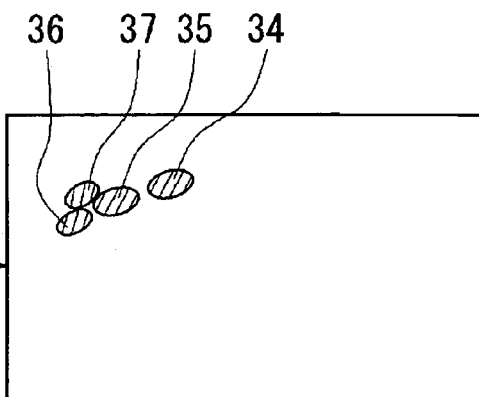

FIGS. 9A and 9B are provided to compare a screen showing an object shot and a screen showing what is actually displayed. FIG. 9A represents the object shot. FIG. 9B represents an image where the object shown in FIG. 9A is actually projected on the screen. The red color components only are extracted and synthesized on this screen, so that the images 34, 35, 36 and 37 of red material objects only are displayed and the background thereof is white or black.

Each pixel of the frames actually displayed on the screen is defined by the following equation (3).

$$P_{Fr}(x, y, t_0) = \sum_{i=0}^{3} \alpha P(x, y, t_0 - const * i) \quad (3)$$

where α or alpha value that indicates the ratio of composition is expressed by the following equation (4).

$$\alpha = P_R(x, y, t_0 - const * i) \quad (4)$$

where $P_R$ is a pixel value of the red color component of a pixel.

The data acquiring unit 64 reads the data for each pixel based on the equation (3), and determines whether the images are to be synthesized or not. In this manner, the pixel extraction by color is realized. Though the pixel value of the red color component is set as the alpha value in the equation (4), it is not limited thereto. If the alpha value is set to $P_G$ or $P_B$, then a green color component or blue color component only is extracted and synthesized. Accordingly, if any specified color component is contained in the object, the particular portion containing the specified color component only is displayed as if it were a lingering after-image.

The image generating apparatus 50 according to this third embodiment has basically the same structure as the apparatus shown in FIG. 3. In accordance with the above equations (3) and (4), the decision processing unit 62 selects a plurality of frames at fixed time intervals. The data acquiring unit 64 and the image formation unit 66 synthesize the read-out data at a ratio determined by a pixel value for each pixel.

Figure 10:
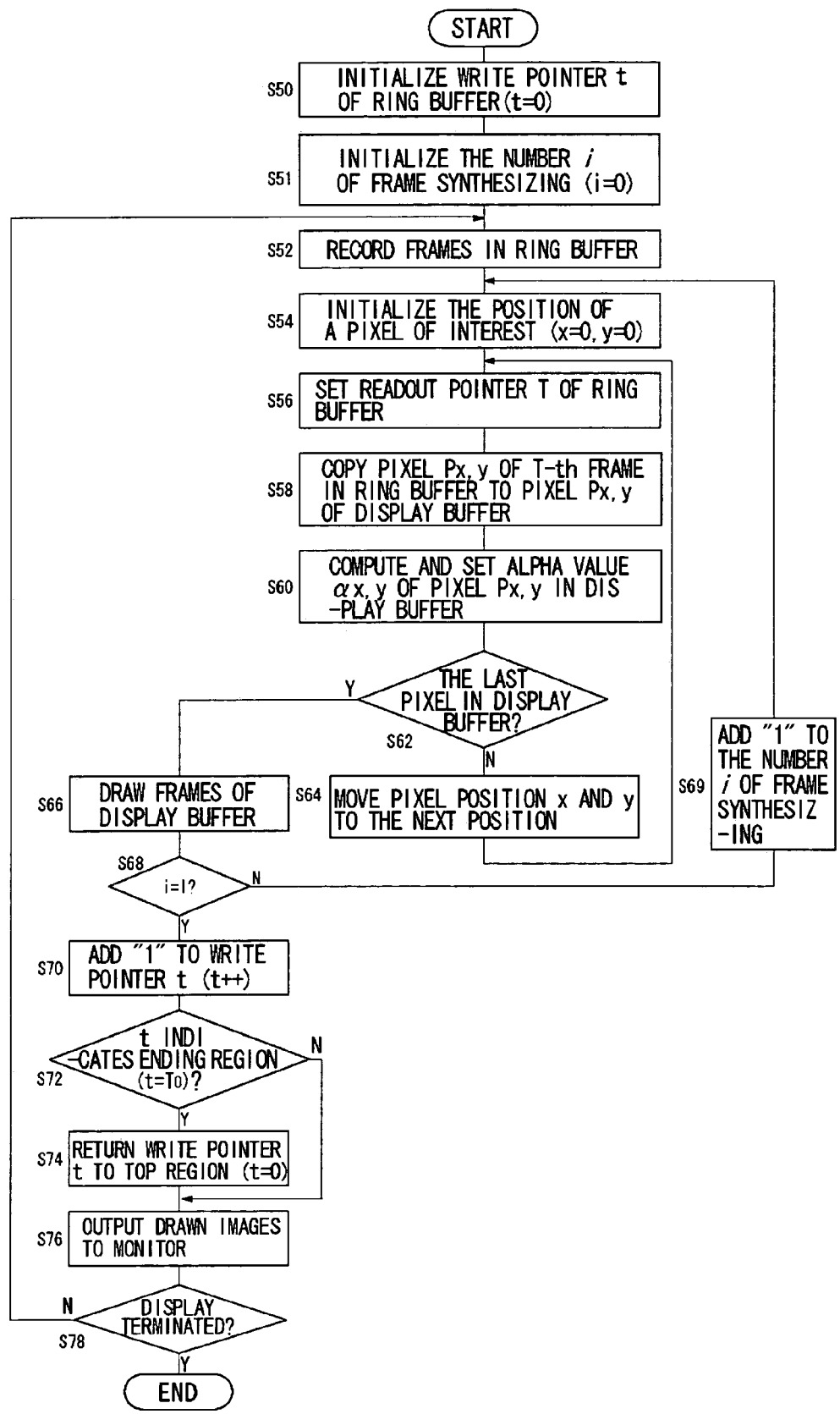
FIG. 10 is a flowchart showing the steps of generating from the original moving pictures the moving images where a desired color component is extracted, according to the third embodiment.

FIG. 10 is a flowchart showing the steps of generating from the original moving pictures the moving images where a desired color component is extracted, according to the third embodiment. First, a write pointer t that indicates the next write position in the ring buffer 56 is initialized, that is, set to t=0 (S50), and the number i of frame synthesizing is initialized, that is, set to i=0 (S51), so that the frames are stored from the top region of the ring buffer 56. The frames contained in the original moving pictures are recorded in the t-th region of the ring buffer 56 (S52).

The positions x and y of a target pixel are initialized in the display buffer 74, that is, the positions x and y are set to x=0 and y=0 (S54), so that the pixels starting from the top left edge of the screen are sequentially copied to the display buffer 74. The position of a readout pointer T in the ring buffer 56 is calculated as read-out positions of data corresponding to the pixels x and y (S56). This readout pointer T is a time value obtained as $T=t_0-const*i$, and indicates a plurality of frames in the past by going back along the time axis at fixed time intervals. The data acquiring unit 64 reads out data of a pixel $P_{x,y}$ from the frames stored in a region of the readout pointer T in the ring buffer 56. Then, the image formation unit 66 copies this read-out data to a region of the pixel $P_{x,y}$ in the display buffer 74 (S58).

An alpha value $\alpha_{x,y}$ of the pixel $P_{x,y}$ is computed and set (S60). When the pixel $P_{x,y}$ is not yet the last pixel in the display buffer 74, namely, when the pixel $P_{x,y}$ is not the pixel of the lower right edge (S62N), the pixel $P_{x,y}$ is moved to the next pixel (S64). The processings of S56 through S62 are repeated until the pixel $P_{x,y}$ becomes the last pixel in the display buffer 74. When the pixel $P_{x,y}$ becomes the last pixel in the display buffer 74, the image for one frame is written to the display buffer 74 (S62Y) and this is drawn by the image formation unit 66 (S66).

If the number i of frame synthesizing has not yet reached a predetermined number I (S68N), "1" is added to the number i (S69) and the processings of S54 through S66 are repeated. In this third embodiment, the predetermined number I is "3" and the synthesizing is repeated four times until the number i of frame synthesizing becomes "3" counted from "0". When the number i of frame synthesizing reaches the predetermined number I (S68Y), "1" is added to the write pointer t (S70). When the write pointer t indicates an ending region of the ring buffer 56 (S74), the write pointer t is returned to the top region of the ring buffer 56 (S74). The image data output unit 76 outputs the drawn image data to the monitor 78 (S76). The processings of S52 through S76 are repeated unit the termination of the display is instructed (S78). In this manner, data of the desired color component only are read out from the past frames in units of pixel and then written to the display buffer.

As a modified example to the third embodiment, the alpha value for a frame corresponding $t_0$, for example, the synthesizing number i=0, that is, the alpha value for the current frame 12 may be set to P instead of $P_R$. In that case, three colors RGB are extracted together, so that not only the red material object images 34-37 but also the person 30 appear simultaneously on the screen shown in FIG. 9B.

Fourth Embodiment

A fourth embodiment according to the present invention differs from the third embodiment in that the attribute value in this fourth embodiment is a value that indicates the order of approximation between a desired image pattern and an actual image. As a result of pattern matching, the more approximate and closer to the desired image pattern the images are, the data thereof are read out from the older frames. Thus, a desired partial image alone contained in the original moving pictures can be displayed at delayed timing.

Figure 11:
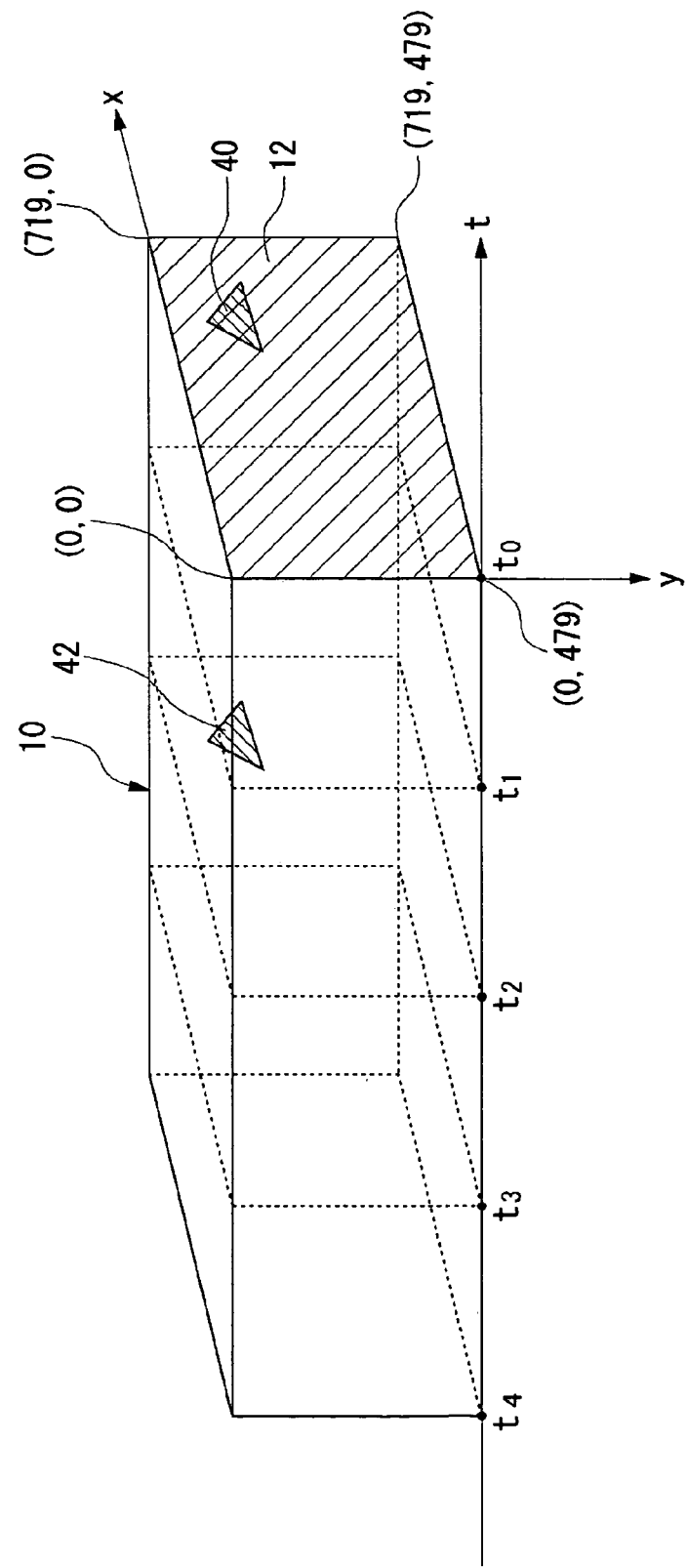
FIG. 11 illustrates, in a virtual manner, the original moving pictures as a box space, according to a fourth embodiment.

FIG. 11 illustrates, in a virtual manner, the original moving pictures as a box space, according to the fourth embodiment. A current frame 20 contained in the box space 10 contains a first image 40. Now, suppose that matching is computed by image patterns so as to approximate the first image 40, then the pixels constituting the first image 40 has higher order of approximation to the image pattern, compared with those in the other regions. Thus, the data corresponding thereto are read out from frames in the past according to the order of approximation by further going back along time axis. Here, by going back to time $t_2$ along the time axis, the data are read out from the position of the second image 42 in a frame having the time value $t_2$. The cut surface of the box space 10 takes a time value of $t_2$ in the region of second image 42 only and takes a time value of $t_1$ in the other regions. Thus, the cut surface has discrete widths in the direction of time axis.

The image generating apparatus 50 according to the fourth embodiment has basically the same structure as the apparatus shown in FIG. 3. The user specifies the image patterns via the instruction acquiring unit 72, and the decision processing unit 62 processes matching between the image pattern and the image of a frame. As a result thereof, the order of approximation to the image pattern is detected pixel by pixel. The decision processing unit 62 determines, for each pixel, a frame from which the data are to be read out, according to the order of approximation thereof.

The flow of processings according to the fourth embodiment will be described with reference to FIG. 7. First, prior to the step S100, the image pattern as an object to which matching is computed is specified by the user, and the matching is computed between the current frame 12 and the image pattern so as to detect the order of approximation, denoted by "s", for each pixel. Namely, as for a pixel in the image region which is approximate to the image pattern, the order of approximation of the image region is set. Steps S100 to S104 are the same as those in the second embodiment. In S106, the readout pointer T is determined according to the order of approximation "s". For example, the readout pointer T is obtained as T=t−s(x,y). The steps taken thereafter are also the same as those in the second embodiment.

Fifth Embodiment

In this fifth embodiment, too, data are read out from separate frames and synthesized according to attribute values of pixels. This attribute value differs from that in the third and fourth embodiments in that it is a value that indicates the degree of temporal change of an image region. For example, among the objects, a region thereof which is moves fast or moves greatly has a large image change in time, so that the data are read out from the older frames. Thus, the display of a region, contained in the original moving pictures, which has a large image change can be delayed, so that the larger the image change is, the further delayed the display of the object's region will be.

The image generating apparatus 50 according to the fifth embodiment has basically the same structure as the apparatus shown in FIG. 3. The degree of change in time between a target frame and a frame immediately prior to this target frame is detected, for each pixel, by a decision processing unit 62. The decision processing unit 62 determines frames from which data are to be read out, according to its degree of change.

The flow of processings according to the fifth embodiment will be described with reference to FIG. 7. In S106, T-th frame and (T−1)th frame in the ring buffer 56 are compared pixel by pixel, and the degree of change, denoted by "c", is detected. The readout pointer T is determined according to its degree of change "c". For example, the readout pointer T is obtained by T=t−c(x,y). As the change of degree "c" increases, a time value by which to indicate how far the time goes back in the past along the time axis increases.

Sixth Embodiment

A sixth embodiment according to the present invention differs from the first embodiment in that the user can freely determine and define, by using interface on the screen, from which frame the data is to be read out for each scanning line. The sixth embodiment will be described hereinbelow with the emphasis on different points from the first embodiment.

Figure 12:
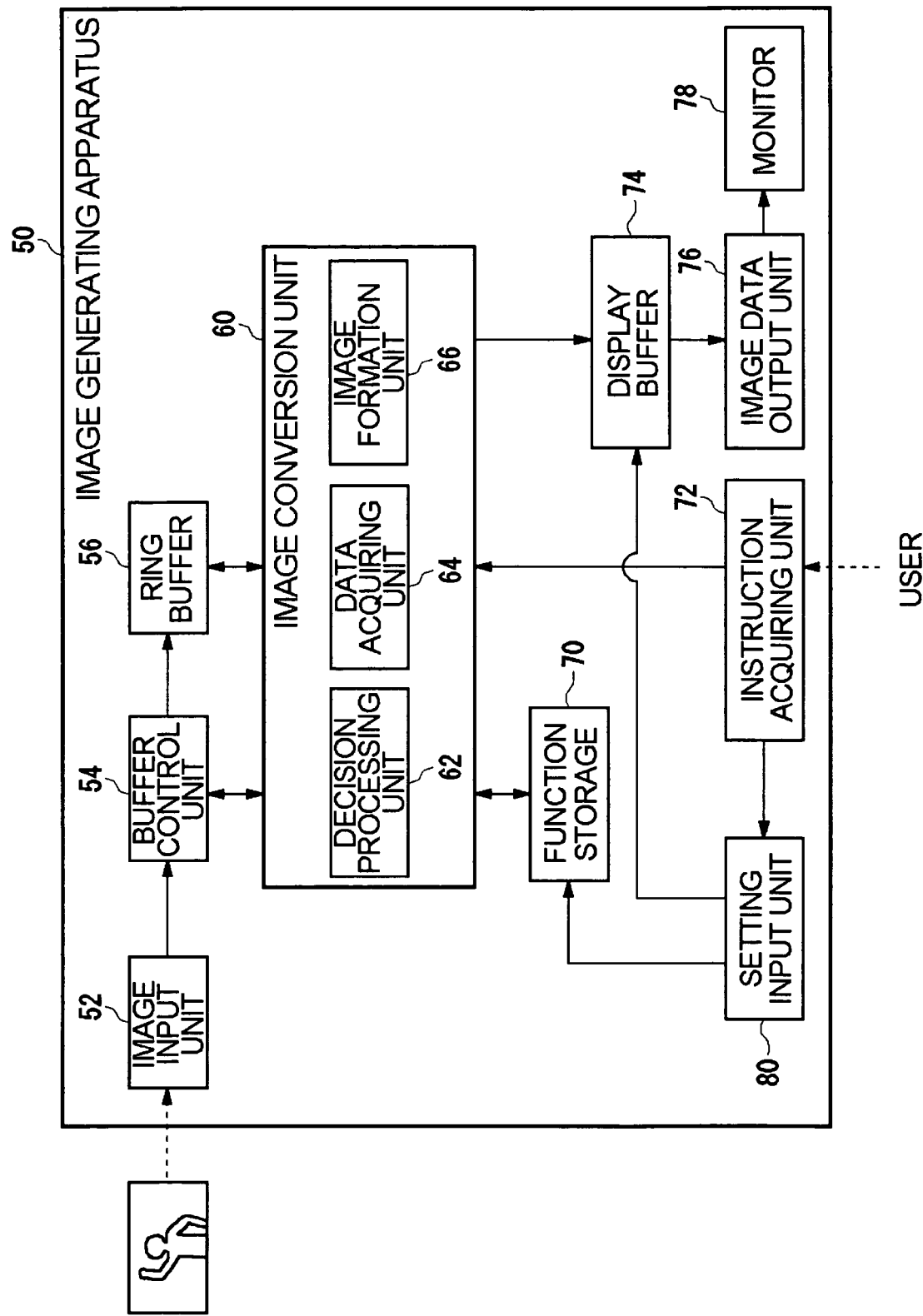
FIG. 12 is a functional block diagram showing a structure of an image generating apparatus.

FIG. 12 is a block diagram showing a structure of an image generating apparatus. The image generating apparatus 50 mainly differs from the image generating apparatus 50 according to the first embodiment shown in FIG. 3 in the point where the apparatus shown in FIG. 12 includes a setting input unit 80. The setting input unit 80 acquires input of a setting value used to define the cut surface 14 of FIG. 1, via an instruction acquiring unit 72 operated by a user. In the sixth embodiment, as a function defining from which frame the data of each pixel line is to be read out, $t=t_0-y$ is a predetermined value which is a default setting value. That is, this function defines how far back in the past the frame should go back. The setting input unit 80 sends to a display buffer 74 an image represented by a graph showing a relation of a time value at $t=t_0-y$ and a coordinate y of the pixel line. An image data output unit 76 displays on a monitor 78 the graph which is generated by the setting input unit 80 and which shows the relation between the time t and the coordinate y. While viewing the graph displayed on the monitor 78, the user operates the instruction acquiring unit 72 and modifies the shape of the graph to change the function of $t=t_0-y$ to another function. The instruction acquiring unit 72 may be, for instance, a touch panel attached to the screen of the monitor 78. In that case, the value that indicates a position on the touch panel pressed by the user is inputted as the operation contents.

The instruction acquiring unit 72 sends to the setting input unit 80 the user's operation contents to change the graph displayed on the monitor 78. Based on the operation contents acquired from the instruction acquiring unit 72, the setting input unit 80 changes the function of $t=t_0-y$ so as to set a new function, and records the thus newly set function in a function storage 70. The decision processing unit 62 reads out the function set by setting input unit 80 from the function storage 70, and determines from which frame the data are to be read out for each pixel line based on this new function. As a result thereof, the box space 10 shown in FIG. 1 is cut by a surface defined by the function set by the setting input unit 80, and an image appearing on the cutting surface is outputted as an actual frame instead of the current frame 12. By implementing the above structure, the user can utilize the image generating apparatus 50 as an authoring tool and can generate mysterious and unique images by freely varying the graph displayed on the screen.

Figure 13:
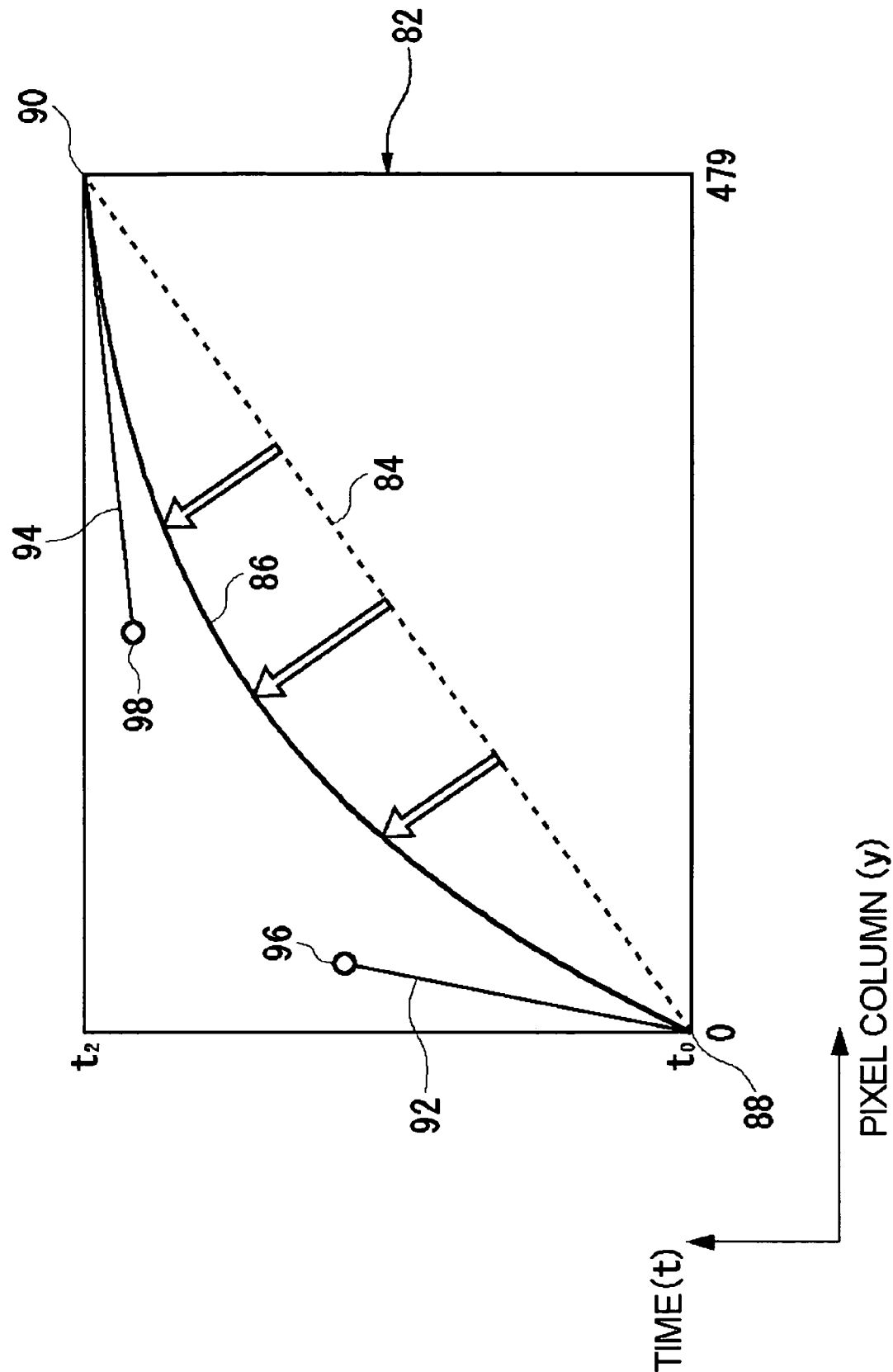
FIG. 13 shows an example of a screen of a monitor that displays a graph of a function determined by a setting input unit.

FIG. 13 shows an example of a screen of a monitor that displays a graph of a function determined by the setting input unit. Initially, a straight line 84 indicating a relation between the time t and the coordinate y in the function $t=t_0-y$ is displayed on a setting screen 82. The user can change the straight line 84 to a Bezier curve 86. The Bezier curve 86 is a curve connecting a first endpoint 88 to a second endpoint 90, and a shape of this curve is determined by positions of a first control point 96 and a second control point 98. The positions of the first control point 96 and the second control point 98 are determined by the user's varying the position and the length of a first handle 92 or a second handle 94. If the function set by the setting input unit 80 is specified by the Bezier curve 86, obtained are images where the data read out from frames close to the present one and the data read out from frames in the past are mixed together for each pixel line. For example, via the setting input unit 80 the user can specify a periodic curve, such as a sinusoidal wave curve, by the Bezier curve 86. Though in the present embodiment the function is specified by the Bezier curve 86, there may be provided a structure, as a modified example, in which the function is specified by other curves such as B-spline curve and the like.

Seventh Embodiment

A seventh embodiment according to the present invention differs from the sixth embodiment in that the setting input unit 80 acquires, as one of the setting values, the coordinates of characteristic points in the current frame 12 and the function is defined by this coordinates of characteristic points. The seventh embodiment will be described hereinbelow with the emphasis on different points from the sixth embodiment.

An instruction acquiring unit 72 is a touch panel attached to the screen of a monitor 78, too. When the user presses the touch panel on a desired position and moves the pressing point in such a manner as to draw a circle, a plurality of continuous values representing the coordinates of the pressing points are sent to a setting input unit 80. Based on the thus obtained coordinate values, the setting input unit 80 recognizes a region surrounded and covered by the plurality of pressing points, and generates functions to determine the surrounding region so as to be recorded in a function storage 70. Based on the function read out from the function storage 70, the data are read out from the past frames as to pixels contained in the surrounding region while the data are read out from the current frames 12 as to pixels not contained in the surrounding region. As a result thereof, the box space 10 shown in FIG. 1 is cut by a surface defined by the function of the coordinates acquired by the setting input unit 80, and an image appearing on the cutting surface is outputted as an actual frame instead of the current frame 12. By implementing the above structure, the user can utilize the image generating apparatus 50 as an authoring tool and can generate mysterious and unique images by specifying an arbitrary region on the touch panel.

Eighth Embodiment

An eighth embodiment according to the present invention differs from the other embodiments in that a function is defined beforehand in a manner such that a predetermined varying shape emerges to the screen, and the data are read out from a frame which is determined based on this function. According to this eighth embodiment, the function is defined beforehand in a manner such that a varying shape of wave-such as a water ring emerges onto the screen.

A decision processing unit 62 determines characteristic points in the current frame 12. Similar to the sixth and seventh embodiments, the characteristic points are specified by the user via a touch panel attached to the screen of a monitor 78 where this touch panel serves as an instruction acquiring unit 72. The decision processing unit 62 determines a source frame and a pixel coordinate so that a wave-like shape of water rings emerges from the characteristic point as a center thereof. Here, the source frame is a frame from which the data are to be read out. For example, in order to express the stereoscopic figure of the water rings, it is assumed that a circle or circles are displayed in the radial direction from the characteristic point, and the decision processing unit 62 determines source frames with gradually differing time values for each radial circle. The change of the gradually differing time value is defined so that it becomes a periodic change. Thereby, the unevenness as in the water rings can be expressed. Moreover, the decision processing unit 62 shifts the pixel coordinate to be read out, by a predetermined amount of pixels in a predetermined direction. Thereby, the refraction of light caused by the water rings can be expressed.

Ninth Embodiment

A ninth embodiment according to the present invention differs from the seventh and eighth embodiments where the touch panel is used as an instruction acquiring unit 72 that inputs the characteristic points in that the characteristic points are determined based on information contained in the current frame 12.

A decision processing unit 62 according to the ninth embodiment determines the characteristic points based on a pixel value of each of pixels contained in the current frame 12. For example, a high-speed flickering LED is incorporated into an object so as to become a part of the object, and the decision processing unit 62 recognizes the flickering position by specifying a region where the pixel value intermittently changes between two values in the continuously inputted current frames 12. The decision processing unit 62 determines the flickering position to be the coordinates of the characteristic points. As a modified example, the decision processing unit 62 may determine the characteristic points using fixed coordinates. As another modified example, the decision processing unit 62 may determine a pixel to be a characteristic point if any one of the following factors which are the pixel value, Z value, order of approximation to a desired pattern and a change of the pixel value of the pixel falls into a predetermined range.

Tenth Embodiment

A tenth embodiment according to the present invention differs from the other embodiments in that an image input unit 52 acquires not only the original moving pictures but also audio data. The audio data that the image input unit 52 acquires are inputted in synchronism with the original moving pictures, so as to be sent to a ring buffer 56. Based on a frequency distribution, a change of sound volume and the like of the audio data, a decision processing unit 62 determines at least one of a source frame, readout timing, alpha value and characteristic points. For example, when the change of sound volume of the audio data exceeds a threshold value, the decision processing unit 62 may determine the source frame and the readout pixel in a manner such that the shape as described in the eighth embodiment emerges to the screen. For example, if the change of sound volume exceeds the threshold value in part of a frequency domain, then the decision processing unit 62 may determine the characteristic points in the eighth and ninth embodiments according to the frequency domain.

Eleventh Embodiment

According to an eleventh embodiment of the present invention, a predetermined graphic is composed in the vicinity of the position of a pixel according to an attribute value of the pixel contained in the target frame. Here, the attribute value is a numerical value that indicates the degree of temporal change of an image region. For example, a region that moves fast or greatly in an object is continuously displayed so that an artistically or dramatically represented object having the form of particle is deformed in a diffusing manner starting from a pixel, whose temporal change is greater, toward its periphery. In this manner, a directing and manipulating effect such as a paper-snowfall-like effect displayed on the screen can be produced in the periphery of a main object in the original image such as a moving region or site.

An image generating apparatus 50 according to the eleventh embodiment has a similar structure to that of the apparatus shown in FIG. 3. A decision processing unit 62 detects, for each pixel, the degree of temporal change of a pixel value of an image region constituting a frame, between the current frame 12 and a previous frame which is a frame before the current frame 12 in time. The decision processing unit 62 regards a pixel as a center position for a directing and manipulating object if the degree of change of this pixel exceeds a predetermined threshold value. And if a plurality of pixels whose degree of change exceed the threshold value exist and are disposed adjacent to one another, then a pixel among them which has the greatest degree of change may be determined to be the center position and a plurality of directing and manipulating objects may be displayed in a diffusing manner around the center position. Moreover, the decision processing unit 62 may determine a movement direction of the directing and manipulating object based on a difference between a pixel in the current frame 12 and a pixel in the previous frame where each of the two pixels has the greatest degree of change in each frame.

Figure 14:
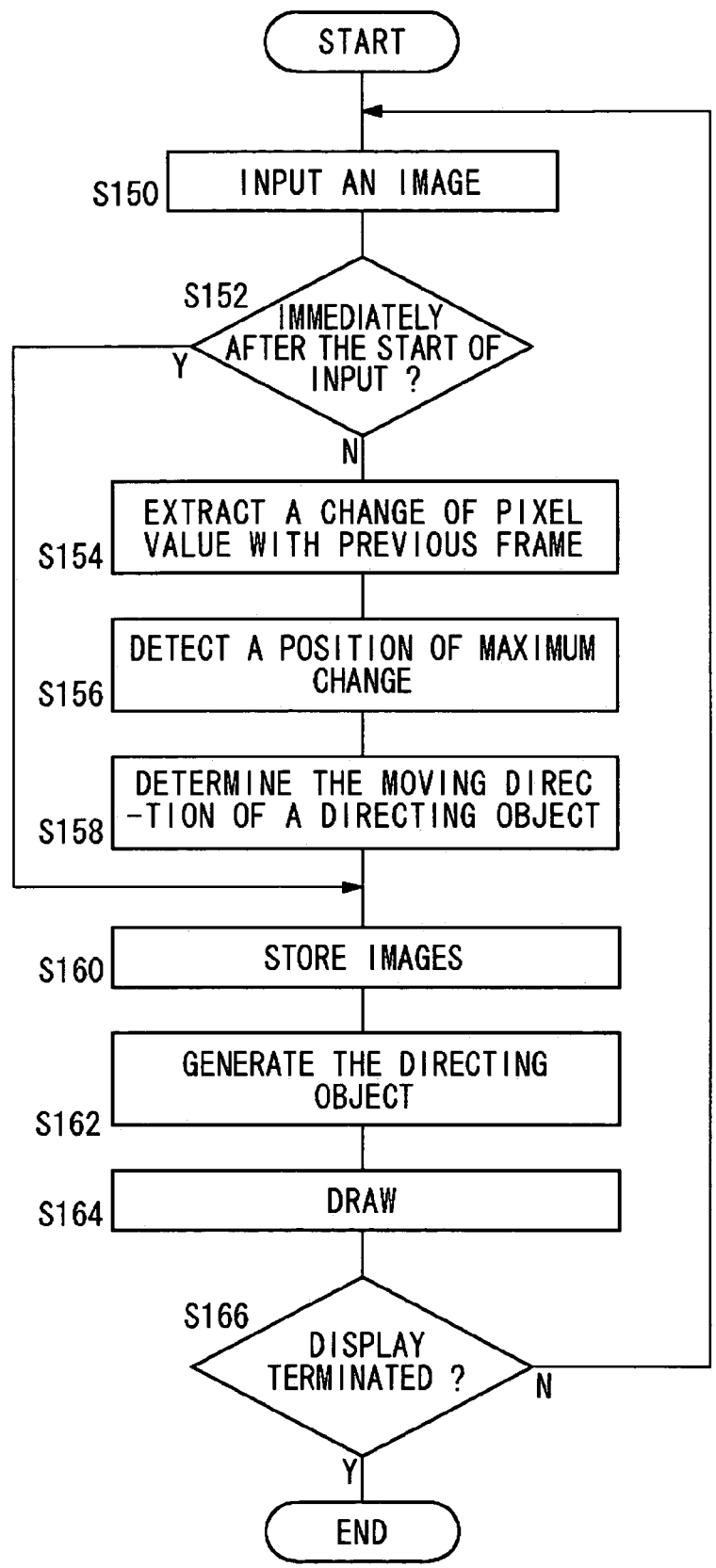
FIG. 14 is a flowchart showing the steps of generating a directing and manipulating object.

FIG. 14 is a flowchart showing the steps of generating a directing and manipulating object. First, a current frame 12 is inputted as a processing object (S150). If a reproduction processing is performed not immediately after the start of an input of the current frame 12 (S152N), a change of pixel values is extracted between the current frame 12 and a frame immediately prior thereto in time (S154), a position where the change of pixel values is greatest is detected (S156), and a vector of positions whose change of pixel values are greatest is determined to be the movement direction of the directing and manipulating object (S158). If the reproduction processing is performed immediately after the start of an input of the current frame 12, there is no such a frame immediately prior thereto, so that the processings S154 through S158 are skipped (S152Y). The current frame 12 is stored separately so as to be compared with the next frame (S160). An image of the directing and manipulating object to be displayed is generated around the periphery of the detected position in S156 as a center (S162). The thus generated directing and manipulating object and the current frame 12 are superposed, so that a drawing to be displayed is processed (S164). By repeating the above processings S150 through S164 until the termination of a display (S166Y), the directing and manipulating object is displayed while being moved in the movement direction determined by S158 (S166N).

In the above example, a structure was described where the position to display the directing and manipulating object is determined according to the change of pixel values with the frame immediately prior thereto. As another example, the decision processing unit 62 may determine the position to perform the directing and manipulating effect according to color component, contour, luminance, Z value, locus of motion or the like. For example, the position where the directing and manipulating effect is to be produced may be determined according to the size of a pixel value such as a "position containing the most of red color components in the image", or a contour line whose difference of pixel values thereof between adjacent contours in a single frame is maximum may be determined as the directing and manipulating position. Here, the "position where the directing and manipulating effect is to be produced" will be hereinafter referred to simply as a "directing position" also. Moreover, a portion whose difference of pixel values thereof between, for example, adjacent "red contours" is greater than the threshold value and whose color component is greater than a threshold value may be determined as the directing position. Moreover, a portion where the luminance is greater than a threshold value may be determined to be the directing position, and a portion having a specific range of Z values may be determined to be the directing position. If a plurality of the past frames are stored for within a limit of a fixed period of time, a locus of characteristic points which are extracted on the basis of a certain criterion can be detected. Thus, the directing and manipulating effect may be produced along such the locus. As a directing and manipulating effect, the decision processing unit 62 may display a linear object or character to which a shining color or the like is applied, or an object such as a symbol. Also, the decision processing unit 62 may produce a directing and manipulating effect where the transparency of a characteristic region extracted from the current frame 12 is changed to a semi-transparent state, so as to be superposed to the past frame.

The decision processing unit 62 may determine the size or moving speed of the directing and manipulating object to be displayed, based on the attribute values such as the coordinates, Z value and pixel value of each pixel, the order of approximation with a desired image pattern and a rate of change in the pixel value. The alpha value used to compose the directing and manipulating object may be a fixed value or different values for the respective pixels. For example, the alpha value may be set according to the attribute values such as the coordinates, Z value and pixel value of each pixel, the order of approximation with a desired image pattern, the degree of change in the pixel value and so forth.

Figure 15:
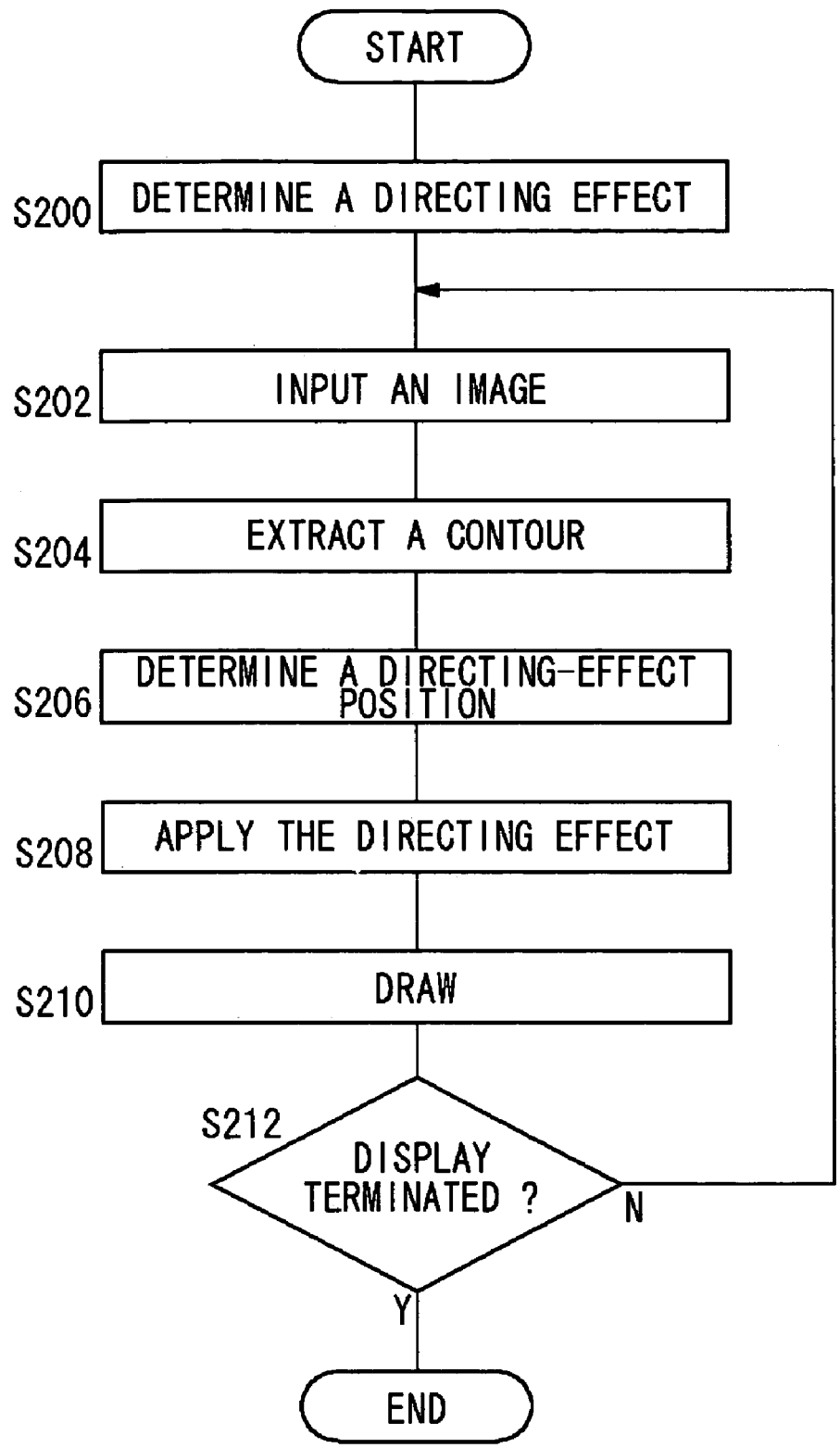
FIG. 15 is a flowchart showing the steps of applying a directing and manipulating effect to a current frame.

FIG. 15 is a flowchart showing the steps of applying a directing and manipulating effect to the current frame 12. First, the type of the directing and manipulating effect to be applied to the current frame 12 is determined based on an instruction from the user (S200). Then, the current frame 12 where the directing and manipulating effect is produced is inputted (S202). Then, a portion where the difference of values of pixels adjacent to each other within the current value 12 exceeds the threshold value is extracted as a contour (S204), and a position where the difference of the pixel values becomes a maximum is determined to be a position where the directing and manipulating effect is to be produced (S206). Then, the directing and manipulating effect is applied to the thus determined position (S208), and a drawing for displaying the images where the directing and manipulating effect is produced is processed (S210). The above processings S202 to S210 are repeatedly performed on the current frame 12 (S212N) until the termination of display (S212Y), so as to apply the directing and manipulating effect thereon.

Twelfth Embodiment

According to a twelfth embodiment, a reproduction frame rate is varied locally according to a change of an attribute value of pixels contained in a target frame. Namely, the cut surface 14 is varied with time at a different rate for each image region according to an attribute value of an image region that constitutes a two-dimensional mage, so that the frame rate of new moving pictures to be outputted from the image data output unit 76 is varied partially. For a portion where the degree of change of a pixel value in time is greater than a threshold value, for example, the time intervals at which the data are read out from a frame is made longer so as to lower the reproduction frame rate. Thereby, a mysterious and unique image will be produced where the faster a region actually moves the slower the region on the display moves and thus part of an object in the moving pictures move at a rate different from the normal speed.

An image generating apparatus 50 according to the twelfth embodiment has basically the same structure as one shown in FIG. 3. A decision processing unit 62 according to the present embodiment may vary the frame rate on the pixel-by-pixel basis or may vary the frame in units of object which is extracted based on a pixel value thereof. The decision processing unit 62 may extract the object in a manner such that a few pixels surrounding the pixel are included as part of a range in question. In this case, a portion, such as an edge of the object, whose pixel value changes gradually may be included as part of the object and processed, too.

As for the region whose frame rate is to be changed, the decision processing unit 62 determines a frame rate after this change. For example, the frame rate may be set according to the degree of temporal change in the pixel value of the region, and the frame rate of a region whose rate of change is greater may be set to a lower value. According to the thus determined frame rate, the decision processing unit 62 determines, for each pixel, the time interval between a source frame and a next frame to be read. The decision processing unit 62 may vary the frame rate with time. For example, the decision processing unit 62 sets first the frame rate to a low rate and gradually increases the frame rate so that it catches up with the display timing of the other pixels that surround this pixel.

As a modified example, a structure may be such that the user can set, via the instruction acquiring unit 72 as shown in FIG. 12, whether or not a processing is performed in a manner such that the edge of the object is included in the range of the object. The frame rate of a pixel having a predetermined range of Z values in the current frame 12 may be varied. The frame rate of a position having a predetermined order of approximation with a desired image pattern in the current frame may be varied. In other words, the frame rate is controlled on the pixel-by-pixel basis here.

Thirteenth Embodiment

According to a thirteenth embodiment of the present invention, data of a pixel having a predetermined attribute value in a target frame are read out from a previous frame in time instead of from the target frame. For example, data of a pixel value corresponding to the black color are read out from an old frame, so that a dramatic representation can be produced as if the partially past images were viewed from a window of a trimming shape.

An image generating apparatus 50 according to the thirteenth embodiment has basically the same structure as one shown in FIG. 3. The decision processing unit 62 according to the present embodiment extracts from the current frame 12 a region having a predetermined range of pixel values, and at the same time determines a source frame of the region. The source frame may be a frame in the past obtained by going back along time axis for a prefixed time duration, or may be determined according to an attribute value such as the coordinates, Z value, pixel value of each pixel, order of approximation with a desired image pattern, magnitude of change in pixel value, or the like.

As a modified example, the older the frame will be, such older frames are gradated, so that the antiquity may be emphasized and dramatically expressed. The decision processing unit 62 may extract a region that also includes a few surrounding pixels. For example, a region corresponding to a mouth together with a few pixels surrounding the mouth are extracted from a human face, so that a portion, such as an edge of an object, where the pixel value gradually changes is extracted without fail. The data are read out from previous frames in time in the above embodiments. However, if future frames in time are also stored in the ring buffer 56, the data may be read out from these future frames.

Fourteenth Embodiment

In a fourteenth embodiment of the present invention, a pixel value is added to a pixel according to a change of an attribute value of the pixel contained in a target frame, so as to change the color. For example, a directing and manipulating effect can be applied to the original image in a manner such that a region that moves greatly in an object is displayed in red or the like.

An image generating apparatus 50 according to the fourteenth embodiment has basically the same structure as one shown in FIG. 3. The decision processing unit 62 according to the present embodiment adds a predetermined value to the pixel value of a pixel so that the pixel whose degree of change in the current frame 12 is large is displayed in red. Thereafter, as for the pixel to which the predetermined value is added, a pixel value to be added to this pixel is gradually reduced with time and, as a result thereof, an after-image leaving a trail of red color behind can be displayed.

As a modified example of the image generating apparatus 50, the structure thereof may be such that data of a pixel that greatly changes in time may be synthesized with a predetermined alpha value in a manner such that the pixel still remains in the screen as it is even after the pixel is once displayed. A pixel value may further be added to the synthesized data, so that the image thereof may be displayed in a desired color. Thereafter, the alpha value of the data to be synthesized is gradually reduced with time and, as a result thereof, an after-image leaving a trail behind can be displayed. As another modified example, a structure may be such that, by using a predetermined alpha value, data of a pixel whose degree of change is high are synthesized with a screen where the alpha values for all pixels of the screen are set to zero, and the whole screen is displayed-gradually. As still another modified example, a pixel value to be added to each pixel may be varied, and the color of a pixel may be varied with time by adding the pixel value of this pixel in an accumulating manner.

Fifteenth Embodiment

In a fifteenth embodiment of the present invention, a target frame is synthesized with a predetermined object according to an attribute value of a pixel contained in a future frame. Namely, a particle-shape object as in the eleventh embodiment is displayed on a region approximate to a predetermined image pattern in a frame to be displayed later in time among frames contained in the original moving pictures stored beforehand. Thereby, a announce-like directing effect can be produced. For example, a paper-snowfall image or the like is displayed before a main person, which is an object here, shows up on the screen.

An image generating apparatus 50 according to the fifteenth embodiment has basically the same structure as one shown in FIG. 3. The decision processing unit 62 according to the present embodiment detects a region which falls within a predetermined range of the order of approximation with respect to a predetermined image pattern in the frames to be displayed later in time, among frames contained in the original moving pictures stored beforehand in the ring buffer 56. The decision processing unit 62 synthesizes particle-shape objects in the vicinity of the detected region. The method of combining and synthesizing the images is the one similar to that described in the eleventh embodiment.

As a modified example, the synthesizing of the object may be applied to real-time moving pictures which are being shot in parallel with the current reproduction of images. Namely, the moving pictures obtained immediately after being shot are temporarily stored in a buffer, and then each frame is reproduced at timing which is delayed from the shooting timing. The predetermined image pattern is extracted from the current frame which is obtained immediately after being shot, and at same time the frame thereof is reproduced at timing which is delayed from the shooting timing, so that a announce-like directing effect can be produced.

The present invention has been described based on the embodiments which are only exemplary. It is understood by those skilled in the art that there exist other various modifications to the combination of each component and process described above and that such modifications are encompassed by the scope of the present invention.

In the second embodiment, the frame from which the data are to be read out is determined according to the Z value. In a modified example, however, a plurality of frames are set at constant time intervals as source frames, and the plurality of frames may be synthesized by a ratio according to the Z value. Recall here that the source frames are frames from which the data are to be read out. In this case, the alpha value will be decided according to the Z value. A region or regions having a relatively large Z value in an object or objects, that is, a region closer to the camera may be set in a manner such that the alpha value thereof is set larger. In that case, the region located closer to the camera will be projected more clearly and sharply, and the region that moves greatly will be displayed in a lingering manner as if it were an after-image.

In the third embodiment, the alpha value is set according to the pixel value. In another modified example, however, the source frame may be determined according to the pixel value. For example, when the pixel values having red color components are extracted, the data on the region having more red-color components are read out from the older frame, so that the display of the region containing more red component is further delayed.

In the fourth embodiment, the source frame is determined according to the order of approximation with the desired image pattern. In still another modified example, however, the alpha value may be set according to the order of approximation. In that case, a region which is more approximate to the image pattern is displayed more clearly and sharply, and a region which moves fast or greatly is displayed in a further lingering after-image manner. Moreover, a plurality of different image patterns are prepared beforehand, and a source frame may be read out according as which particular pattern is to be used for taking the order of approximation with. Or, an alpha value may be determined according as which particular pattern is to be used for taking the order of approximation with. The recognition of an image may be not only the recognition per frame but also that of a gesture over a plurality of frames.

In the fifth embodiment, the source frame is determined according to the degree of temporal change in the image region. In still another modification, however, the alpha value may be set according to the degree of change. In that case, a region having a greater degree of change is displayed more clearly and sharply and displayed also in a lingering after-image manner.

In each of the first to fifteenth embodiments, the correspondence relation of the pixels among a plurality of frames is judged by the same coordinates (x, y). According to still another modification, however, the correspondence relation may be judged by shifting the coordinates by specific pixels, or whether such the shifting shall be made or not may be judged according to the attribute or width of a pixel.

In the second to fifth embodiments, the respective source frames are determined according to the respective single attribute values or alpha values. In still another modification, however, the source frame or alpha value may be determined on the basis of a plurality of attribute values among the Z value, the pixel value, the order of approximation and the degree of change. For example, after a source frame is determined for a certain pixel according to the Z value thereof, the pattern matching may be computed between said frame and the current frame 12 and then a plurality of frames may be synthesized according to an alpha value corresponding to the order of approximation thereof. In that case, if the object is located closer to the camera, the data are read out from the older frames and, besides, the region moving greatly is displayed in a lingering after-image manner.

In each of the first to fifteenth embodiments, there is provided a structure such that the source frames, contained in the original moving pictures, which correspond to a certain period of time, are stored in advance in the ring buffer 56. In still another modification, however, the image input unit 52 may read out frames determined by the decision processing unit 62 from original moving pictures which are compressed in an MPEG format, and the buffer control unit 54 may cause to store these frames in the ring buffer 56. These frames to be stored may be decoded by the buffer control unit 54. Moreover, the buffer control unit 54 may refer to frames prior to and after the frame.

Hereinbelow, further modifications will be described.

1-1. In the first embodiment, there is provided a structure such that the data are read out from a different frame for each pixel line. In this modified example 1-1, a structure may be such that some past frames which are the source frames are set, and the data are read out from any of these set frames for each pixel line. For example, a structure may be such that two frames A and B are set as source frames and the data are read out from A or B according to whether the order of the pixel line is odd-numbered or even-numbered. For example, a structure may be such that six frames A, B, C, D, E and F are set as source frames, the data of pixel lines 0th to 79th are read out from the frame A, and the data of pixel lines 80th to 159th are read out from the frame B and so forth. In other words, the pixel lines are divided in units of 80 lines and the data for each unit of the divided lines are read out from the different past frame. When the data are read out from respectively different frames for each unit consisting of fifty pixel lines on the screen, a banding pattern or the like emerges on a region with movement.

1-2. In the second embodiment, there is provided a structure such that the data are read out from different frames according to the Z value. In this modified example 1-2, a structure may be such that the data of only pixels having a predetermined range of Z values are read out from the past frames. For example, at least one of the upper limit and the lower limit of Z value is set beforehand, and one or more past frames from which the data thereof are read out are also set beforehand. As for a pixel having a Z value which falls within the range set below the upper limit and above the lower limit, the data are read out from the past frames set. As, for a pixel having a Z value which does not fall within the range set, the data are read out from the current frame 12. Here, the number of source frames to be set may be fixed to one or more frames, or the source frame may be the past frames according to the coordinates of a pixel of the source frame.

1-3. In the third embodiment, there is provided a structure such that the data of pixels having a predetermined pixel value are read out from a plurality of frames in the past and are synthesized with the current frame 12. In this modified example 1-3, a structure may be such that, as for pixels of the current frame 12 having a predetermined pixel value, the data are read out from a predetermined past frame whereas, as for the other pixels, the data are read out from the current frame 12. Moreover, the past frames which serve as source frames may be set in a fixed manner, or the source frame may be a frame in the past according to the pixel value thereof.

1-4. In the fourth embodiment, there is provided a structure such that the data are read out from the frame in the past that corresponds to the order of approximation to a desired image pattern. In this modified example 1-4, a structure may be such that the data for only pixels whose order of approximation to the desired image pattern lies within a predetermined range are read out from frames in the past whereas the data for the other pixels are read out from the current frame 12. As a range of the order of approximation, at least one of the upper limit and the lower limit thereof may be set beforehand. The past frames which serve as source frames may be set in a fixed manner, or the source frame may be a frame in the past, obtained by going back along time axis, according to the order of approximation.

1-5. In the fifth embodiment, there is provided a structure such that the data are read out from the past frame according to the change of the pixel value. In this modified example 1-5, a structure may be such that the data for only pixels whose change of the pixel value lies in a predetermined range are read out from the past frames whereas the data for the other pixels are read out from the current frame 12. The past frames which serve as source frames may be set in a fixed manner, or the source frame may be a frame in the past, obtained by going back along time axis, according to the change of the pixel value.

1-6. In the first embodiment, a function $t=t_0-y$ is defined in terms of the time value t and the pixel coordinate y. In this modified example 1-6, the relation between the time t and the pixel coordinate y may be defined to be $t=\sin y$ and the like which uses a trigonometric function. In the graph depicted in FIG. 13, periodically mixed are the pixel line where the data thereof are read out from frames in the past going further back along the time axis, and another pixel line where the data thereof are read out from newer frames. Moreover, as in the modified example 1-1, a structure may be such that some past frames which are source frames are set beforehand, and the data for each pixel line are read out from any of these set frames that correspond to the time value t.

2-1. In the first embodiment, there is provided a structure such that the data are read out from the past frame for each pixel line and these data are arranged in the vertical direction so as to construct one frame. In this modified example 2-1, a structure may be such that the data which are read out from the past frame for each pixel line is synthesized with the current frame 12 so as to form one frame. In this case, the alpha value may be a fixed value or may differ for each pixel line. For example, the alpha value may be set according to the coordinates, Z value, pixel value of each pixel, order of approximation thereof with a desired image pattern, change of the pixel value thereof and so forth.

2-2. In the second embodiment, there is provided a structure such that the data are read out from different frames according to the Z values. In this modified example 2-2, a structure may be such that data which are read out from different frames according to Z values are synthesized with the current frame 12 so as to form one frame. Or, data for only pixels having a predetermined range of Z values in the current frame 12 are read out from the past frame, and such data are synthesized with the current frame 12 so as to form one frame. The alpha value in such cases may be a fixed value or may differ for each pixel line. For example, the alpha value may be set according to the coordinates, Z value, pixel value of each pixel, order of approximation thereof with a desired image pattern, change of the pixel value thereof and so forth.

2-3. In the third embodiment, there is provided a structure such that the data of a pixel having a predetermined pixel value among a plurality of the past frames are read out so as to be synthesized with the current frame 12. In the modified example 2-3, a structure may be such that, as for a pixel having a predetermined pixel value in the current frame 12, the data thereof are read out from a predetermined frame in the past and such data are synthesized with the current frame 12. The alpha value in such a case may be a fixed value or may differ for each pixel line. For example, the alpha value may be set according to the coordinates, Z value, pixel value of each pixel, order of approximation thereof with a desired image pattern, change of the pixel value thereof and so forth.

2-4. In the fourth embodiment, there is provided a structure such that the data are read out from the past frame that corresponds to the order of approximation with a desired image pattern. In this modified example 2-4, a structure may be such that the data read out from the past frame that corresponds to the order of approximation with the desired image pattern are synthesized with the current frame 12. Or, data for only pixels whose order of approximation with the desired image pattern lies within a predetermined range are read out from the past frame, and such data are synthesized with the current frame 12. The alpha value in such cases may be a fixed value or may differ for each pixel line. For example, the alpha value may be set according to the coordinates, Z value, pixel value of each pixel, order of approximation thereof with a desired image pattern, change of the pixel value thereof and so forth.

2-5. In the fifth embodiment, there is provided a structure such that the data are read out from the frame in the past going back along time axis, according to the change of a pixel value. In this modified example 2-5, a structure may be such that the data read out from the past frame according to the change of a pixel value is synthesized with the current frame 12. Or, data for only pixels whose change of the pixel value lies within a predetermined range are read out from the past frame, and such data are synthesized with the current frame 12. The alpha value in such cases may be a fixed value or may differ for each pixel line. For example, the alpha value may be set according to the coordinates, Z value, pixel value of each pixel, order of approximation thereof with a desired image pattern, change of the pixel value thereof and so forth.

2-6. In the modified example 1-6, the relation between the time t and the pixel coordinate y is defined to be t=sin y and the like which uses a trigonometric function. As further modification to this, the data read out from the present to past frames based on a function using a trigonometric function such as t=sin y are synthesized with the current frame 12. The alpha value in such a case may be a fixed value or may differ for each pixel line. For example, the alpha value may be set according to the coordinates, Z value, pixel value of each pixel, order of approximation thereof with a desired image pattern, change of the pixel value thereof and so forth.

2-7. In the sixth embodiment, there is provided a structure such that the data are read out from a frame that corresponds to the Bezier curve 86 set on the setting screen 82 by the user. In this modified example 2-7, a structure may be such that the data read out from the frame based on the Bezier curve 86 set on the setting screen 82 by the user are synthesized with the current frame 12. The alpha value in such a case may be a fixed value or may differ for each pixel line. For example, the alpha value may be set according to the coordinates, Z value, pixel value of each pixel, order of approximation thereof with a desired image pattern, change of the pixel value thereof and so forth.

3-1. In this modified example, a structure may be such that two or more piece of data read out for each pixel in at least two embodiments or modified examples among the first to fifteenth embodiments, 1-1 to 1-6 modified examples and 2-1 to 2-7 modified examples are synthesized. The alpha value in such a case may be a fixed value or may differ for each pixel line. For example, the alpha value may be set according to the coordinates, Z value, pixel value of each pixel, order of approximation thereof with a desired image pattern, change of the pixel value thereof and so forth.

Although the present invention has been described by way of exemplary embodiments, it should be understood that many changes and substitutions may further be made by those skilled in the art without departing from the scope of the present invention which is defined by the appended claims.

What is claimed is:

1. An image generating method, including:
regarding original moving pictures as two-dimensional images that vary along a time axis, and when the moving pictures are expressed, in a virtual manner, as a box space formed by the two-dimensional images and the time axis, cutting the box space by a surface that contains a plurality of points each of which differs from the other in time value, wherein the cutting the box space is performed by a processing unit based apparatus;
projecting a first image that appears on the cut surface onto a first plane perpendicular to the time axis;
varying the cut surface in time;
projecting a second image that appears on the varied cut surface onto a second plane perpendicular to the time axis; and
outputting the first and second images appearing on the first and second planes as new moving pictures.

2. An image generating method according to claim 1, wherein varying the cut surface in time is realized by moving the surface along the time axis.

3. An image generating method according to claim 1, wherein the surface is defined by a function of coordinates of points contained in the two-dimensional images.

4. An image generating apparatus, including:
an image memory which sequentially stores original moving pictures along a time axis;
an image conversion unit which regards the original moving pictures stored in said image memory as two-dimensional images that vary along time axis and, when the moving pictures are expressed, in a virtual manner, as a box space formed by the two-dimensional images and the time axis, cuts the box space by a surface that contains a plurality of points each of which differs from the other in time value, and which projects an image that appears on the cut surface onto a plane perpendicular to the time axis; and
an image data output unit which outputs, as new moving pictures, the images appearing on the plane obtained by varying the cut surface in time in said image conversion unit such that:
said image data output unit outputs, as the new moving pictures, a first image obtained by projecting the image that appears on the cut surface onto a first plane perpendicular to the time axis and a second image obtained by projecting the image that appears on the varied cut surface onto a second plane perpendicular to the time axis.

5. An image generating apparatus according to claim 4, wherein said image conversion unit realizes varying the cut surface in time by moving the surface along the time axis.

6. An image generating apparatus according to claim 4, wherein the surface is defined in a manner such that the surface has continuous or discrete width in the direction of the time axis, and said image conversion unit synthesizes images covered within the width.

7. An image generating apparatus according to claim 4, wherein said image conversion unit cuts the box space by a surface defined by a function of coordinates of an image region constituting the two-dimensional image.

8. An image generating apparatus according to claim 7, wherein the surface is defined by a function which does not depend on a horizontal coordinate of the two-dimensional image.

9. An image generating apparatus according to claim 4, wherein said image conversion unit cuts the box space by a surface which is defined by a function of attribute values for an image region constituting the two-dimensional image.

10. An image generating apparatus according to claim 4, further including a setting input unit which acquires, via a user operation, input of a setting value used to define the surface, wherein said image conversion unit cuts the box space by the surface defined by a function of the setting value acquired by said setting input unit.

11. An image generating apparatus according to claim 10, wherein the function of the setting value acquired by said setting value input unit is expressed by a curve that indicates a relation between coordinates of points contained in the two-dimensional images and time values thereof when a relation between the function of the setting value and a variable of the function is displayed on a screen.

12. An image generating apparatus according to claim 10, wherein said setting input unit acquires, as the setting value, coordinates of characteristic points in the two-dimensional images, and wherein said image conversion unit cuts the box space by a curve defined by a function of the coordinates of the characteristics points.

13. An image generating apparatus according to claim 4, wherein said image conversion unit partially changes a rate of the new moving-picture frame to be outputted from said image data output unit in a manner such that, according to attribute values of image regions that constitute the two-dimensional images, the cut surface is varied in time with different speed for each of the image regions.

14. An image generating apparatus according to claim 4, wherein the time value that defines the surface includes at least one of a past or a future with the present time being a center thereof.

15. An image generating apparatus which includes an image memory, an image conversion unit and an image data output unit,
wherein said image memory records, in sequence, original moving pictures for each frame,
wherein said image conversion unit regards original moving pictures stored in said image memory as two-dimensional images that vary along a time axis, and, when the moving pictures are expressed, in a virtual manner, as a box space formed by the two-dimensional images and the time axis, cuts the box space by a surface that contains a plurality of points each of which differs from the other in time value, and projects an image that appears on the cut surface onto a plane perpendicular to the time axis, such that:
said image conversion unit determines, for each in-picture position of an image contained in a target frame, a plurality of frames at predetermined time intervals from the frames recorded in said image memory, and
said image conversion unit creates the image that appears on the cut surface by reading out, from the plurality of frames, data that correspond to the in-picture position and synthesizing the data at an alpha value according to an attribute value thereof, for each in-picture position, and
wherein said image data output unit outputs, as new moving pictures, the images that appear on the perpendicular surface by varying the cut surface in time, such that:
said image data output unit outputs, as the new moving pictures, a first image obtained by projecting the synthesized image appearing on the cut surface onto a first plane perpendicular to the time axis and a second image obtained by projecting the synthesized image appearing on the varied cut surface onto a second plane perpendicular to the time axis.

16. An image generating apparatus which includes an image memory, an image conversion unit and an image data output unit,
wherein said image memory records, in sequence, original moving pictures for each frame,
wherein said image conversion unit regards original moving pictures stored in said image memory as two-dimensional images that vary along a time axis, and, when the moving pictures are expressed, in a virtual manner, as a box space formed by the two-dimensional images and the time axis, cuts the box space by a surface that contains a plurality of points each of which differs from the other in time value, and projects an image that appears on the cut surface onto a plane perpendicular to the time axis, such that:
said image conversion unit creates the image that appears on the cut surface by reading out, for each in-picture position of an image contained in a target frame, data that correspond to the in-picture position from a frame temporally displaced from the target frame by an amount determined by an attribute value of the in-picture position, and then synthesizing the data at an alpha value according to the attribute value, and wherein said image data output unit outputs, as new moving pictures, the images that appear on the perpendicular surface by varying the cut surface in time, such that:

said image data output unit outputs, as the new moving pictures, a first image obtained by projecting the synthesized image appearing on the cut surface onto a first plane perpendicular to the time axis and a second image obtained by projecting the synthesized image appearing on the varied cut surface onto a second plane perpendicular to the time axis.

17. An image generating apparatus according to claim 16, wherein the target frame or the at least one of frames is at least one of a previous frame in time or a subsequent frame in time with respect to a reference frame which should have been naturally outputted by said image data output unit from said image memory.

18. An image generating apparatus according to claim 16, wherein, for each in-picture position of the images contained in the target frame, said image conversion unit adds a predetermined pixel value in accordance with an attribute value thereof.

19. An image generating apparatus according to claim 9, wherein the attribute value is a depth value.

20. An image generating apparatus according to claim 15, wherein the attribute value is a depth value.

21. An image generating apparatus according to claim 9, wherein the attribute value is a value that indicates the order of approximation relative to a desired image pattern.

22. An image generating apparatus according to claim 15, wherein the attribute value is a value that indicates the order of approximation relative to a desired image pattern.

23. An image generating apparatus according to claim 9, wherein the attribute value is a value that indicates a degree of change of an image area in time.

24. An image generating apparatus according to claim 15, wherein the attribute value is a value that indicates a degree of change of an image area in time.

25. An image generating apparatus according to claim 9, wherein the attribute value is a pixel value.

26. An image generating apparatus according to claim 15, wherein the attribute value is a pixel value.

27. An image generating apparatus according to claim 4, further including an image input unit which acquires, as the original moving pictures, images shot by a camera and sends the images to said image memory.

28. An image generating apparatus according to claim 15, further including an image input unit which acquires, as the original moving pictures, images shot by a camera and sends the images to said image memory.

29. An image generating apparatus according to claim 15, further including a setting input unit which acquires, via a user operation, input of a setting value used to determine the at least one of frames, wherein said image conversion unit determines the at least one of frames according to the setting value acquired by said setting input unit.

30. An image generating apparatus according to claim 29, wherein the setting value acquired by said setting input unit is expressed by a curve that indicates a relation between coordinates of points contained in the two-dimensional images and time values thereof when displayed on a screen.

31. An image generating apparatus according to claim 29, wherein said setting input unit acquires, as the setting value, coordinates of characteristic points in the two-dimensional images and wherein said image conversion unit determines the at least one of frames according to the coordinates of the characteristic points.

32. A non-transitory computer readable medium encoded with a computer program, the computer program including the functions of:

regarding original moving pictures as two-dimensional images that vary along time axis, and when the moving pictures are expressed, in a virtual manner, as a box space formed by the two-dimensional images and the time axis, cutting the box space by a surface that contains a plurality of points each of which differs from the other in time value;

projecting a first image that appears on the cut surface onto a first plane perpendicular to the time axis;

varying the cut surface in time;

projecting a second image that appears on the varied cut surface onto a second plane perpendicular to the time axis; and outputting the first and second images appearing on the first and second planes as new moving pictures.

33. A non-transitory computer readable medium encoded with a computer program, the computer program configured to perform steps comprising:

recording, in sequence, original moving pictures in a memory for each frame;

determining, for a first in-picture position of a first image contained in a first target frame, a first plurality of frames at predetermined time intervals from the frames recorded in said memory, and reading out, from the first plurality of frames, first data that correspond to the in-picture position;

synthesizing the first data with the first target frame to be output at an alpha value according to an attribute value thereof, for each in-picture position;

determining, for a second in-picture position of a second image contained in a second target frame, a second plurality of frames at predetermined time intervals from the frames recorded in said memory, and reading out, from the second plurality of frames, second data that correspond to the in-picture position; and synthesizing the second data with the second target frame to be output at an alpha value according to an attribute value thereof, for each in-picture position;

wherein said determining, said reading-out and said synthesizing regard original moving pictures stored in said memory as two-dimensional images that vary along a time axis, and, when the moving pictures are expressed, in a virtual manner, as a box space formed by the two-dimensional images and the time axis, cutting the box space by a surface that contains a plurality of points each of which differs from the other in time value, and projecting an image that appears on the cut surface onto a plane perpendicular to the time axis, the program further configured to perform steps comprising:

forming new moving pictures by sequentially outputting at least the first and second synthesized frames along a time axis,
wherein said forming outputs, as new moving pictures, the images that appear on the perpendicular surface by varying the cut surface in time.

34. An image generating apparatus according to claim 4, wherein the first plane and the second plane coincide with each other.

35. An image generating apparatus according to claim 15, wherein the first plane and the second plane coincide with each other.

36. An image generating apparatus according to claim 16, wherein the first plane and the second plane coincide with each other.

* * * * *